United States Patent
Zhou et al.

(10) Patent No.: US 9,753,518 B2
(45) Date of Patent: Sep. 5, 2017

(54) ELECTRONIC APPARATUS AND DISPLAY CONTROL METHOD

(71) Applicant: Lenovo (Beijing) Co., Ltd., Beijing (CN)

(72) Inventors: Xiaoyu Zhou, Beijing (CN); Xiaoming Liu, Beijing (CN); Yiqiang Yan, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 11 days.

(21) Appl. No.: 14/584,762

(22) Filed: Dec. 29, 2014

(65) Prior Publication Data
US 2016/0085286 A1    Mar. 24, 2016

(30) Foreign Application Priority Data
Sep. 24, 2014    (CN) .......................... 2014 1 0493724

(51) Int. Cl.
*G06F 3/044*    (2006.01)
*G06F 1/32*    (2006.01)
(Continued)

(52) U.S. Cl.
CPC ............ *G06F 1/3231* (2013.01); *G06F 1/163* (2013.01); *G06F 1/1637* (2013.01);
(Continued)

(58) Field of Classification Search
CPC .......... G06F 3/012; G06F 3/013; G06F 3/014; G06F 3/016; G06F 3/017; G06F 3/0346;
(Continued)

(56) References Cited

U.S. PATENT DOCUMENTS

| 5,396,443 | A | * | 3/1995 | Mese | ........... | G06F 1/3215 |
| | | | | | | 713/321 |
| 2007/0075965 | A1 | * | 4/2007 | Huppi | .............. | G06F 3/0418 |
| | | | | | | 345/156 |

(Continued)

FOREIGN PATENT DOCUMENTS

| DE | 20 2007009526 U1 | 1/2008 |
| DE | 2013009033 U1 | 2/2014 |

OTHER PUBLICATIONS

Office Action issued in corresponding German Patent Application 102014019651.8 on Aug. 7, 2015, 16 pages (including translation).

*Primary Examiner* — Lun-Yi Lao
*Assistant Examiner* — Jarurat Suteerawongsa
(74) *Attorney, Agent, or Firm* — Brinks Gilson & Lione; G. Peter Nichols

(57) ABSTRACT

An electronic apparatus and a display control method are described. The electronic apparatus includes a first display unit having a first visible part for displaying a first image; a first detecting unit for detecting a first parameter for indicating a relative distance between a target object and the first visible part; and a processing unit for generating an image to be displayed and for controlling the display of the first display unit according to at least the first parameter. When the first display unit is in a first state, if the relative distance is less than or equal to a threshold distance according to the first parameter, the processing unit controls the first display unit to switch from the first status to a second state, and the power consumption of the first display unit in the first state is lower than a power consumption in the second status.

13 Claims, 18 Drawing Sheets watching remotely: display of time    watching nearby: display of time

(51) Int. Cl.
*G06F 1/16* (2006.01)
*G06F 3/00* (2006.01)
*G06F 3/01* (2006.01)

(52) U.S. Cl.
CPC ............ *G06F 1/3215* (2013.01); *G06F 3/005* (2013.01); *G06F 3/013* (2013.01); *G06F 3/017* (2013.01)

(58) Field of Classification Search
CPC ......... G06F 2200/1637; G06F 3/03547; G06F 3/041; G06F 3/0412; G06F 3/0414; G06F 3/046; G06F 3/047; G06F 2203/041; G06F 3/044; G06F 3/045; G06F 2203/04107; G06F 2203/04111; G06F 2203/04112; G06F 2203/04113; G06F 3/042; G06F 3/0421; G06F 3/0423; G06F 3/0428; G06F 2203/04109; G09G 1/005; G09G 2330/021; G09G 2330/022; G09G 2330/023; G09G 2330/024
See application file for complete search history.

(56) References Cited

U.S. PATENT DOCUMENTS

| | | |
|---|---|---|
| 2008/0167834 A1 | 7/2008 | Herz et al. |
| 2014/0278229 A1 | 9/2014 | Hong et al. |
| 2015/0193102 A1* | 7/2015 | Lanier .................... G06F 3/017 715/746 |

* cited by examiner watching remotely:
display of time watching nearby:
display of time watching remotely:
summary of information watching nearby:
detail of information watching remotely:
direction watching nearby:
detailed information of
geographic position watching remotely: status of movement watching nearby: current change of strength of movement watching remotely: icon watching nearby: overview of icon

ELECTRONIC APPARATUS AND DISPLAY CONTROL METHOD This application claims priority to Chinese patent application No. 201410493724.4 filed on Sep. 24, 2014, the entire contents of which are incorporated herein by reference.

This disclosure relates to field of computer technology, and more particularly, this disclosure relates to an electronic apparatus and a display control method.

BACKGROUND

In recent years, a portable electronic apparatus such as a mobile phone, a multimedia player, a personal digital assistant (PDA), a smart watch and a smart hand ring become popular. And, with a fast development of electronic technology, at the same time of decreasing volume of the electronic apparatus continually, functions integrated are increasing and more conveniences are provided.

Generally, these electronic apparatus is not only able to communicate, but also to record events and play multimedia file or the like. For this reason, a display such as a liquid crystal display (LCD), an organic electroluminescence display, an organic light-emitting diode (OLED) display or the like is usually provided with the electronic apparatus.

However, at present, a status switching of the display (for example, turning on and turning off or the like) is usually controlled by a user manually. For example, the user can make the display to switch between different statuses by pressing a physical button (for example, a power supply button, a function button or the like) provided on a surface of the electronic apparatus.

It is obvious that such manner of status switching is not flexible and convenient enough.

SUMMARY

According to one aspect of the present disclosure, an electronic apparatus includes a first display unit including a first visible part and for displaying a first image, wherein the first visible part is a part watched by a user so as to perceive a display content thereof in the first display unit; A first detecting unit for detecting a first parameter for indicating a relative distance between a target object and the first visible part in a detection area which is at least partially overlapped with a watching area of the first visible part; And a processing unit for generating an image to be displayed and controlling display of the first display unit according to at least the first parameter, wherein, when the first display unit is in a first state, if it decides that the relative distance is less than or equal to a threshold distance according to the first parameter, the processing unit controls the first display unit to switch from the first status to a second state, and a power consumption of the first display unit in the first state is lower than a power consumption of the first display unit in the second status.

Further, according to another aspect of the present disclosure, A display control method applied in an electronic apparatus including: a first display unit including a first visible part and for displaying a first image, wherein the first visible part is a part watched by a user so as to perceive a display content thereof in the first display unit; A first detecting unit for detecting a first parameter for indicating a relative distance between a target object and the first visible part in a detection area which is at least partially overlapped with a watching area of the first visible part; And a processing unit for generating an image to be displayed and controlling a display of the first display unit according to at least the first parameter; and the display control method includes: detecting the first parameter in the detection area; And controlling a display of the first display unit according to at least the first parameter, wherein, controlling the display of the first display unit according to at least the first parameter includes: when the first display unit is in a first state, if it decides that the relative distance is less than or equal to a threshold distance according to the first parameter, controlling the first display unit to switch from the first status to a second state, wherein, a power consumption of the first display unit in the first state is lower than a power consumption of the first display unit in the second status.

BRIEF DESCRIPTION OF THE DRAWINGS

The accompanying drawings are for providing further understanding of this disclosure, and constitute a part of the specification and for explaining this disclosure together with the embodiments, instead of constituting limitation to this disclosure.

DETAILED DESCRIPTION

The respective embodiments according to the present disclosure are described detailed with reference to the accompanying drawings. Here, it is noted that the same reference number are given to constituent part with substantially same or similar structure and function, and the repetitive description thereof are omitted.

Firstly, functional modules of an electronic apparatus according to the embodiment of the present disclosure are described detailed with reference to FIG. 1.

Figure 1:
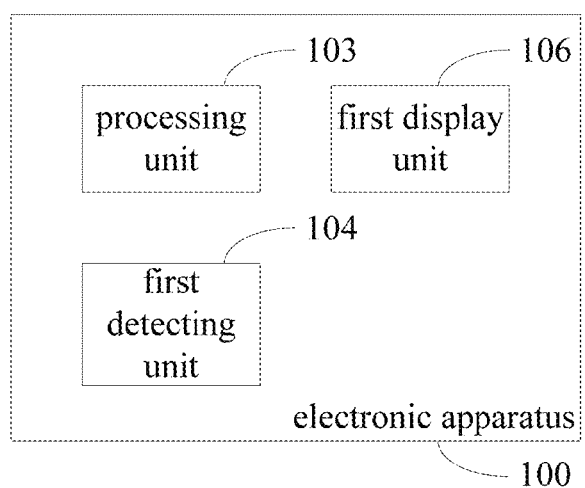
FIG. 1 illustrates a functional block diagram of an electronic apparatus according to the embodiment of the present disclosure.

FIG. 1 illustrates a functional block diagram of the electronic apparatus according to the embodiment of the present disclosure.

As shown in FIG. 1, an electronic apparatus 100 according to the embodiment of the present disclosure includes a processing unit 103, a first display unit 104 and a first detecting unit 106.

Firstly, the processing unit 103 is for generating an image to be displayed and executing display control.

For example, the processing unit 103 includes a central processing unit (CPU), a micro-processing unit (MPU), a digital signal processor (DSP), a field programmable gate array (FPGA), an application specific integrated circuit (ASIC) and/or other chips having processing capacity or the like.

Secondly, the first display unit 104 includes a first visible part (or referred as a first visible area) and for displaying a first image, and the first visible part is a part watched by a user so as to perceive a display content thereof in the first display unit. More particularly, the first display unit 104 outputs the first image generated by the processing unit 103 under a display control executed by the processing unit 103, so as to make the user to be able to perceive the first image through the first visible part. For example, the first image is any types of display data including, but not limited to: an image, a video, a text or even more generally, a graphical user interface of an application or a standby picture of the electronic apparatus 100 or the like.

For example, the first visible part of the first display unit 104 has a watching area, so that only when eyes of the user is in the watching area, the user can watch the first image generated by the processing unit 103 from the first visible area of the first display unit 104.

For example, the first display unit 104 is a display unit following various kinds of display principals. In one embodiment, the first display unit 104 is a near-eye optical display system, that is, the first display unit 104 is for outputting a virtual image corresponding to the first image.

Being limited by the display principle of the near-eye optical display system, at this time, the watching area is relatively narrow and a watching distance is relatively short. That is, only when the eyes of the user is very close to the first display unit 104, the user can watch an enlarged virtual image corresponding to the first image from the first visible area of the first display unit 104.

Alternatively, in another embodiment, the first display unit 104 is also a normal optical display system including, but not limited to a liquid crystal display unit, an organic electroluminescence display unit, an organic light-emitting diode display unit, an E-Ink type display unit or the like.

Depending on a display principle of a normal display system, at this time, the watching area is relatively broad and the watching distance is relatively far. That is, as long as an angle between a line of sight of the user and the first visible area of the first display unit 104 is larger than a predetermined angle (for example, 0 degree), the user can watch a normal real image corresponding to the first image from the first visible area of the first display unit 104. When the line of sight of the user is perpendicular to the first visible area of the first display unit 104, that is, when an angle there between is 90 degree, the user obtains an optimal watching experience.

At last, the first detecting unit 106 is for detecting a first parameter in a detection area, and the first parameter is for indicating a relative distance between a target object and the first visible part of the first display unit 104. More particularly, the first detecting unit 106 detects the first parameter in the detection area under a detection control executed by the processing unit 103.

In order to make the first detecting unit 106 be able to detect the relative distance between the user and the first display unit 104 to decide whether the user carries out a watching action to the first display unit 104 and to automatically control a display switching of the first display unit 104 accordingly, the detection area of the first detecting unit 106 partially overlaps with the watching area of the first visible part. That is, the first detecting unit 106 at least detects whether the user is close to the first visible part of the first display unit 104 in an overlapping area between the detection area and the watching area.

For this reason, the first detecting unit 106 is a detecting unit following various kinds of collecting principals. For example, the first detecting unit 106 is a proximity sensor (P-sensor) for generating a first parameter for representing a distance between the target object (for example, specific part of a body of the user, such as eyes) and the electronic apparatus by various kinds of manners, so that the processing unit 103 can trigger the display switching of the first display unit.

Generally, a principle of operation of the P-sensor is that, after the electronic apparatus starts, a wake lock (wakelock) object of the P-sensor can be created in an operational environment. Then, the P-sensor is turned on by using the object when the first display unit 104 in the electronic apparatus is in a first status of low power consumption. For example, a routine for turning on the P-sensor would decide whether a current electronic apparatus has the P-sensor, and if any, it registers a P-sensor monitor to a sensor manager (SensorManager). The P-sensor monitor would detect whether a change in distance appears between the electronic apparatus and the body of the user. Next, when the P-sensor detects that a distance between the electronic apparatus and the body of the user changes, it acquires a distance value of this change in distance, and detects a time difference between this change in distance and last change in distance. If the time difference is less than a threshold set by a system, the processing unit is not notified to switch a status of the first display unit, this is because that an operating system wants to neglect an over-frequent operation to avoid an erroneous judgment. In contrary, if the time difference is larger than or equal to the threshold set by the system, it indicates that this is a normal change, and when the P-sensor detects that this change in distance is less than a system default value, it notifies the processing unit to switch the first display unit from a first status of low power consumption to a second status of high power consumption.

For example, in a first case, the first detecting unit 106 is an infrared proximity sensor which is essentially a photo-rectifier, and a light-source which is able to transmit infrared light wavelength, for example, a laser diode (LED) is placed next to it. When there is an object getting closer, an infrared light transmitted by the light-source would be reflected by the object so as to be received by the proximity sensor, thus, it senses that the object approaches.

In particular, at this time, the first parameter is light intensity of the infrared light reflected. Different light intensities represent different distance values. Alternatively, when the infrared proximity sensor has a certain processing capacity, it also calculates corresponding distance values according to different light intensities. That is, at this time, the first parameter is the distance value itself.

Also for example, in a second case, the first detecting unit 106 is also a parallax graph capturing device for capturing a parallax graph in the detection area. For example, the parallax graph is shot directly by a dedicated parallax camera. Alternatively, a grey graph (or a color graph) is shot by a binocular camera, a multi-nodular camera, a stereoscopic camera, and then corresponding parallax graph is obtained by calculating according to the grey graph (or the color graph). Further, the parallax graph here is not limited to be obtained by a plurality of cameras, but may also be obtained by a camera based on time domain. For example, an image can be obtained by being shot by a camera in a moment as a left image, and then another image is obtained by being shot after moving the camera a position slightly as a right image, and a parallax graph can be obtained by calculating based on thus obtained left image and right image.

In particular, at this time, the first parameter is pixel values in the captured parallax graph of the target object (for example, pixel values of the closest part of the target object, average pixel value of the entire target object or the like). In the parallax graph, different pixel values represent different distance values. Alternatively, when the parallax graph capturing device has a certain processing capacity, it also calculates corresponding distance values according to different pixel values. That is, at this time, the first parameter is also the distance value itself.

Thus, the first detecting unit 106 detects the first parameter through various kinds of manners, and send the detected first parameter to the processing unit 103, so that the processing unit 103 controls a display of the first display unit 104 according to at least the first parameter.

In particular, firstly, the first detecting unit 106 detects the first parameter continually in its own detection area. It is obvious that, in order to reduce a power consumption of the first detecting unit 106, this detecting operation is also executed according to predetermined interval or be executed based on a trigger signal. For example, the processing unit 103 generates a detection trigger signal after the user turns off the first display unit 104, to trigger the first detecting unit 106 to start to detect when the user wants to turn on the first display unit 104 again.

Then, for example, the first detecting unit 106 decides a relative relationship between the relative distance and a threshold distance according to the first parameter, so as to generate an operation trigger signal, so that the processing unit 103 switches the display status of the first display unit according to at least the operation trigger signal. For example, when the first parameter is the distance value itself, the first detecting unit 106 decides the relative relationship between the relative distance and the threshold distance directly. In contrary, when the first parameter is parameter value for representing the distance value, the first detecting unit 106 decides a relative relationship between the parameter value (for example, a reflected infrared light intensity) and a threshold parameter (for example, an infrared light intensity corresponding to the threshold distance), so as to decide the relative relationship between the relative distance and the threshold distance.

Alternatively, in order to use a computing capacity of the processing unit 103 and reduce a processing burden of the first detecting unit 106 sufficiently, a comparison operation of the relative distance with the threshold distance is transferred to be executed in the processing unit 103. That is, after the first detecting unit 106 detecting the first parameter, the relative relationship between the first parameter and the threshold parameter is decided by the processing unit 103, and the display status of the first display unit is switched accordingly.

In the embodiment, depending on a display principle of the first display unit 104, the processing unit 103 controls the display of the first display unit according to different manners, however, a general control principal is definite, that is, when the user enters into the watching area of the first visible part of the first display unit 104, the processing unit 103 turns on the first display unit 104 automatically to make the user to be able to operate the electronic apparatus 100.

Based on the above-described control principle, in one embodiment, when the first display unit 104 is in a first state, if it decides that the relative distance is less than or equal to the threshold distance according to the first parameter, the processing unit 103 controls the first display unit 104 to switch from a first status to a second state, and a power consumption of the first display unit in the first state is lower than a power consumption of the first display unit in the second status.

For example, the first status is an off-status of the first display unit 104, and the second status is an on-status of the first display unit 104. That is, when the first display unit 104 is in the off-status, if it decides that the user has already entered into the watching area according to the relative distance between the user and the first visible part, the processing unit 103 turns on the first display unit 104 automatically, to make the user to watch and operate the electronic apparatus 100.

Thus it can be seen, by using the electronic apparatus according to the embodiments, the relative distance between the user and the first visible part in the first display unit of the electronic apparatus can be detected, and the display of the first display unit is controlled automatically according to the relative distance. Thus, there provides an automatic status switching manner of the display unit, which avoids the user to intervene, so as to improve the user experience.

Then, an external structure and specific implementation mode of the electronic apparatus according to the embodiment of the present disclosure are further described detailed with reference to FIG. 2A to FIG. 5C.

For example, the electronic apparatus 100 may be in various kinds of forms. For example, the electronic apparatus is a wearable electronic apparatus or a non-wearable electronic apparatus.

In one embodiment, in order for the user to carry the electronic apparatus more conveniently, the electronic apparatus according to the embodiment is in a form of the wearable electronic apparatus. That is, the electronic apparatus is the wearable electronic apparatus which may be worn on an arm, a wrist or a finger or the like of the user, so as to form an armband type electronic apparatus (for example, in an armlet form), a wristlet type electronic apparatus (for example, in a watch or a hand ring form) or a finger belt type electronic apparatus (in a ring form), and so on.

In other embodiments, the electronic apparatus may also be the non-wearable electronic apparatus, i.e., an electronic apparatus with normal form, which may be attached to a specific body part of the user (for example, a hand of the user) by being hold or being grasped, or may also be attached to a specific body part of the user (for example, the arm, the wrist or the finger or the like of the user) by a specific wearing device (for example, a portable package, a binding rope or the like binding on the arm, the wrist or the finger). Thus, universality for using and carrying of the electronic apparatus is ensured well, which satisfies various kinds of regular requirements of the user.

Hereinafter, for the convenience of description, it describes by taking the wearable electronic apparatus such as the smart watch as example.

As the wearable electronic apparatus, in order to be able to be attached to the specific body part of the user, the electronic apparatus according to the embodiment includes: a body device and a fixing device.

Firstly, the electronic apparatus according to the embodiment is described detailed with reference to FIG. 2A and FIG. 2B. For example, the electronic apparatus according to the embodiment is the wearable electronic apparatus such as the smart watch. Of course, as explained in the above, those skilled in the art is easy to understand that, the electronic apparatus according to the embodiment is not limited thereto, but may include any electronic apparatus having the display unit therein.

Figure 2A:
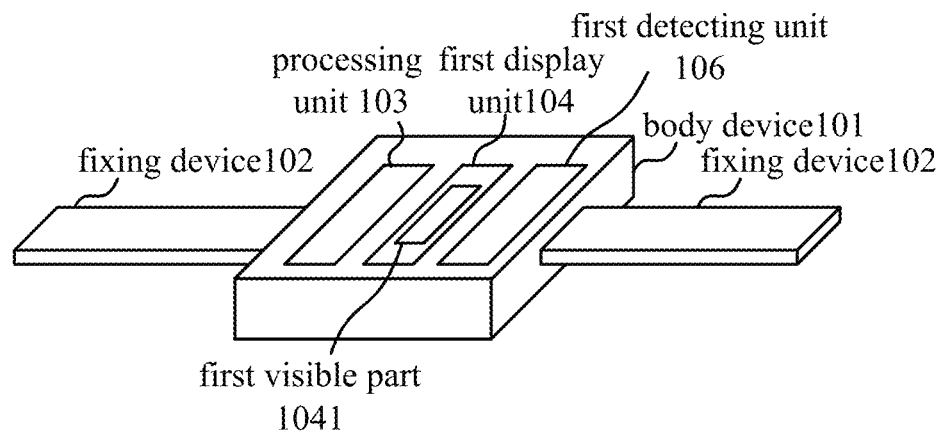
FIGS. 2A and 2B illustrate a structured block diagram of the electronic apparatus according to the embodiment of the present disclosure.
Figure 2B:
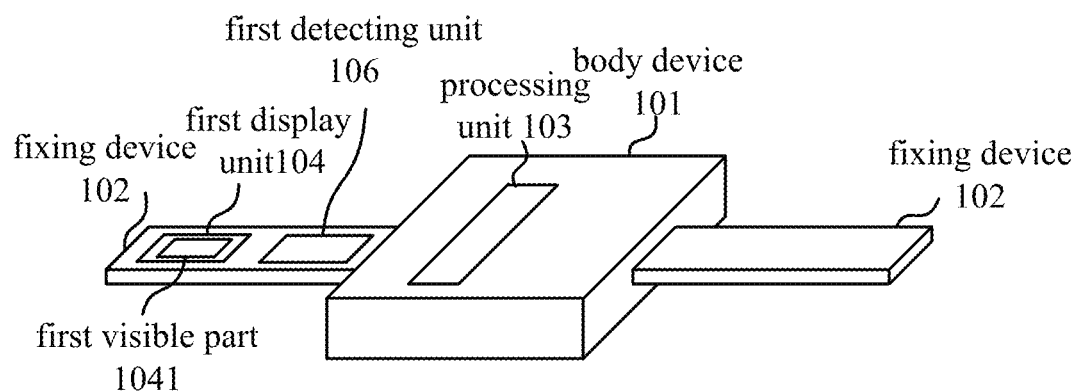

FIGS. 2A and 2B illustrate structured block diagrams of the electronic apparatus according to the embodiment of the present disclosure. As shown in FIG. 2A and FIG. 2B, the electronic apparatus 100 according to the embodiment includes a body device 101 and a fixing device 102. Wherein, the fixing device 102 is connected with the body device 101, and the fixing device 101 is fixing a relative position relationship with the user of the electronic apparatus. The fixing device 102 includes at least a fixing status in which the fixing device 102 is able to be as an annular space or at least a part of an approximate annular space satisfying a first predetermined condition, here, and the annular space or the approximate annular space is able to surround at periphery of a columnar body satisfying a second predetermined condition.

Hereinafter, first configuration example to fourth configuration example of the fixing device are described with reference to FIG. 3A to FIG. 3D. In FIG. 3A to FIG. 3D, in order for simplicity and clarity of description, it only illustrates the body device 101 and the fixing device 102 in the electronic apparatus 100.

Figure 3A:
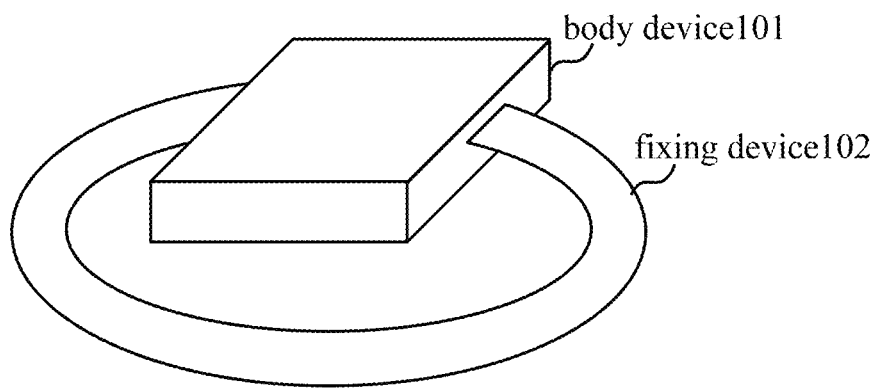
FIGS. 3A to 3D illustrate a first configuration example to a fourth configuration example of a fixing device in the electronic apparatus according to the embodiment of the present disclosure respectively.
Figure 3B:
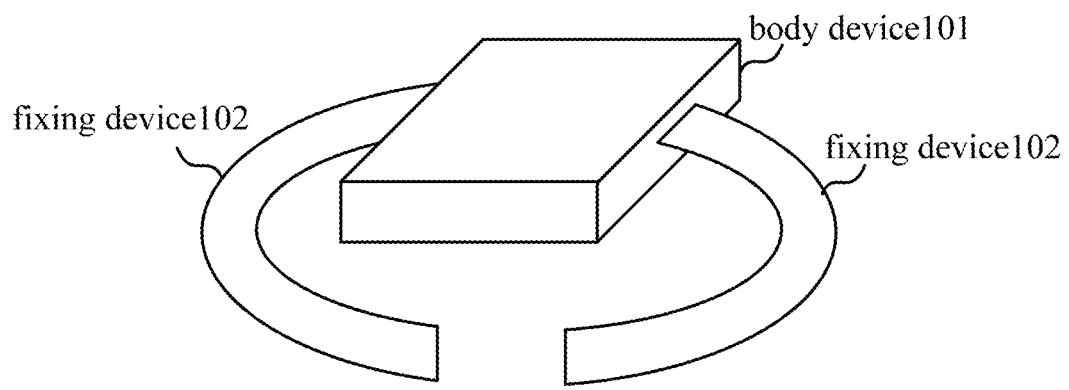

In particular, FIG. 3A and FIG. 3B illustrate two kinds of fixing status connecting the fixing device 102 and the body device 101 respectively. In a first fixing status as shown in FIG. 3A, the fixing device 102 forms a loop-locked annular space with the body device 101, wherein the fixing device 102 and the body device 101 constitute a part of the annular space respectively. In a second fixing status as shown in FIG. 3B, the fixing device 102 forms an approximate annular space having a small opening with the body device 101, wherein the fixing device 102 and the body device 101 constitute a part of the approximate annular space respectively. In an embodiment, the body device 101 is a dial plate part of the smart watch and the fixing device 102 is a watchband part of the smart watch. The annular space or the approximate annular space formed by the body device 101 and the fixing device 102 can surround at the periphery of the wrist of the user of the smart watch as the columnar body, and a diameter of the annular space or the approximate annular space is larger a diameter of the wrist of the user and less than a diameter of first of the user.

Figure 3C:
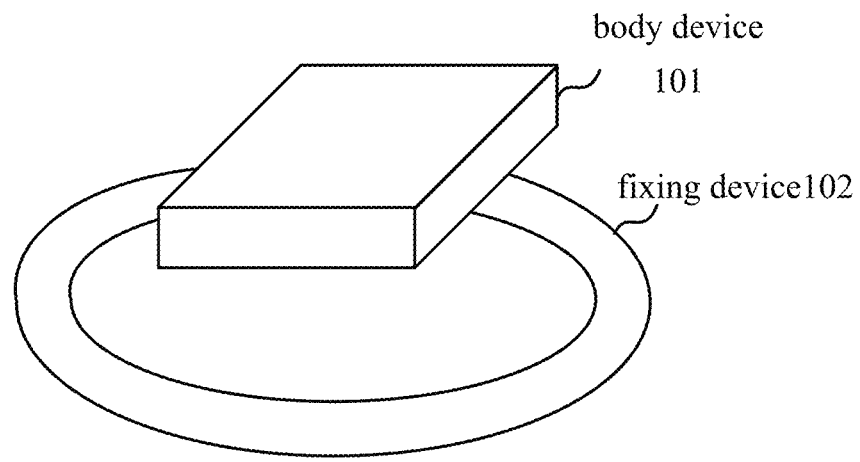
Figure 3D:
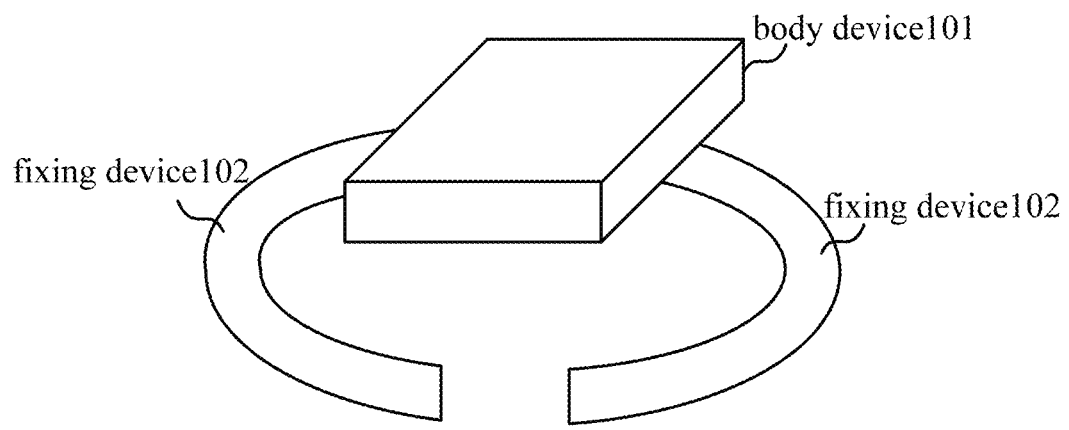

Further, the annular space or the approximate annular space is also formed by the fixing device 102 itself. As shown in FIG. 3C and FIG. 3D, the body device 101 is arranged on the fixing device 102 (that is, the body device 101 is attached to the fixing device 102 in a manner of surface contacting), so that only the fixing device 102 itself forms the annular space (FIG. 3C) or the approximate annular space (FIG. 3D) for surrounding the columnar body. The fixing device 102 is provided with a fixing mechanism (not shown) such as a hasp, a snap, a zipper or the like.

Back to FIG. 2A and FIG. 2B, the configuration of the electronic apparatus 100 is further described.

More particularly, as shown in FIG. 2A and FIG. 2B, the processing unit 103 and the first display unit 104 are arranged on the body device 101. The processing unit 103 is for generating an image to be displayed and executing display control. The first display unit 104 is for outputting a first image. More particularly, the first display unit 104 outputs the first image generated by the processing unit 103 under the display control executed by the processing unit 103. In the electronic apparatus 100 shown in FIG. 2A, the first display unit 104 is arranged on the body device 101. However, those skilled in the art are easy to understand that the present disclosure is not limited thereto. For example, in the electronic apparatus 100 shown in FIG. 2B, the first display unit 104 is also arranged on the fixing device 102.

More particularly, when the electronic apparatus 100 includes a plurality of first display units 104, it is obvious that, these first display units 104 are provided on the body device 101 and/or the fixing device 102 respectively.

However, when the electronic apparatus 100 includes only one first display unit 104, since the first display unit 104 is constituted by a plurality of independent functional modules, these functional modules are also provided on the body device 101 and/or the fixing device 102 respectively, that is, the single first display unit 104 is also provided on the body device 101 and/or the fixing device 102. For example, when the first display unit 104 is the near-eye optical display system, if the near-eye optical display system is understood as including only the first visible part in narrow sense, the first display unit 104 is provided on the body device 101 or the fixing device 102. In contrary, if the near-eye optical display system is understood as including the functional modules such as the first visible part, a lens group, an internal imaging unit or the like in a broad sense, it is obvious that these different functional modules are provided on the body device 101 and/or the fixing device 102 respectively.

Further, the first display unit 104 is the display unit following various kinds of display principals. For example, the first display unit 104 is the near-eye optical display system.

More particularly, the first display unit 104 includes the first visible part 1041 which is a part watched by the user so as to perceive a display content in the first display unit 104. That is, the first display unit 104 includes a plurality of components depending on a principle thereof as described below, and wherein the first visible part 1041 is an area in which the user observes display of image content actually.

At this time, a position of the first display unit 104 described above actually refers to a position of the first visible part 1041.

Hereinafter, a principle and an implementation mode of the first display unit 104 is described specifically with reference to FIG. 4A to 4D and FIG. 5A to 5C.

Figure 4A:
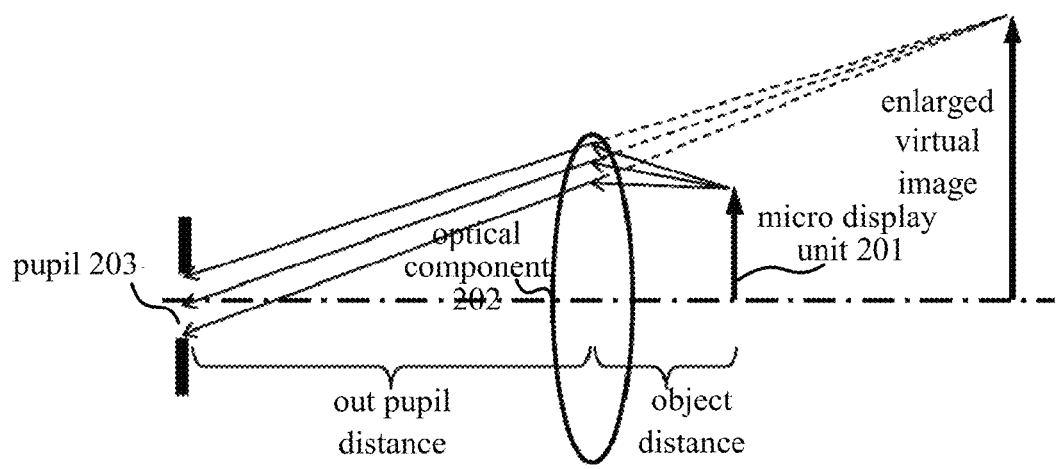
FIGS. 4A to 4D illustrate principal diagram and implementation mode of a near-eye optical display system adopted in the electronic apparatus according to the embodiment of the present disclosure.

FIG. 4A illustrates a principal diagram of the near-eye optical display system used in the electronic apparatus according to the embodiment. In the electronic apparatus according to the embodiment, the near-eye optical display system is used as the first display unit 104. As shown in FIG. 4A, a micro display unit 201 in the near-eye optical display system emits a light ray corresponding to the displayed image thereof to be received and subjected to a corresponding light path conversion by an optical component 202 such as the lens group. As a result, a light ray after the light path conversion enters into pupil 203 of a watcher to form an enlarged virtual image.

Figure 4B:
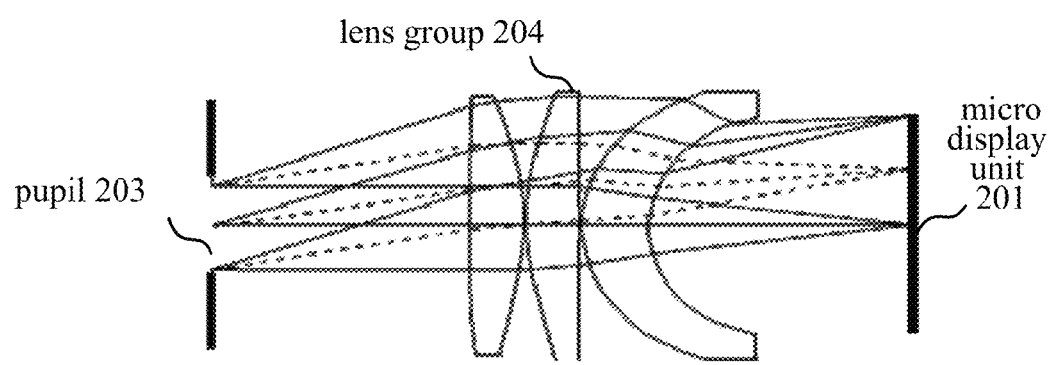
Figure 4C:
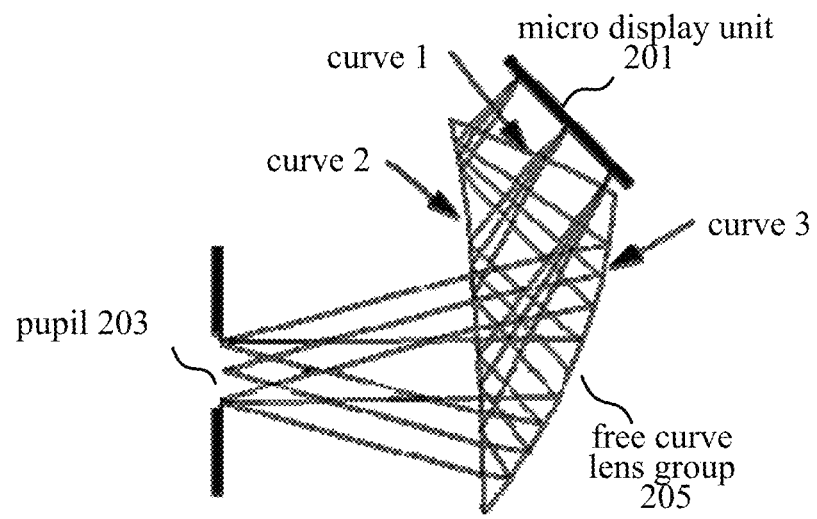
Figure 4D:
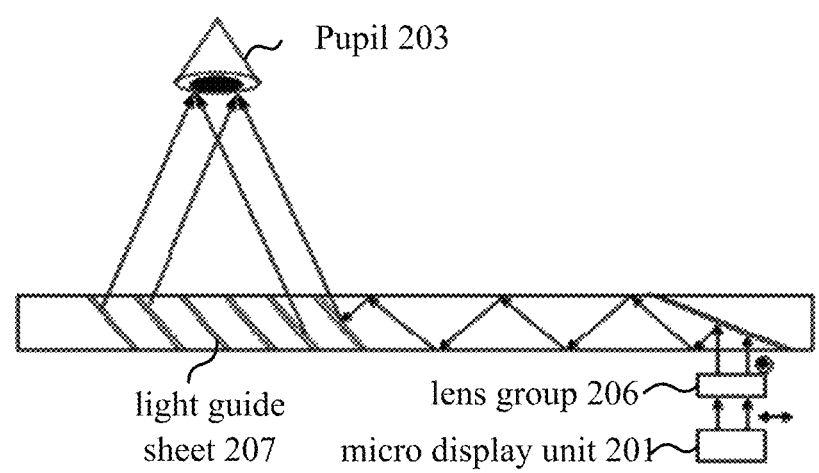

FIG. 4B to FIG. 4D further illustrate three specific implementation modes based on the principal diagram as shown in FIG. 4A. In particular, the technical solution as shown in FIG. 4B adopts a refraction-diffraction mixing curved surface design in which a lens group 204 corresponds to the optical component 202 as shown in FIG. 4A, so as to reduce volume required by glasses. The technical solution shown in FIG. 4C adopts a free curved surface design in which a free curved surface lens group 205 including a curved surface 1, a curved surface 2 and a curved surface 3 corresponds to the optical component 202 as shown in FIG. 4A, so as to further reduce the volume required by the glasses. The technical solution as shown in FIG. 4D adopts a parallel flat panel design in which a light guide sheet 207 is included in addition to a lens group 206 corresponding to the optical component 202 as shown in FIG. 4A. By using the light guide sheet 207, in case of reducing a thickness of the required glasses, a control such as shift is carried out to an exit direction of a light ray forming the enlarged virtual image (i.e., a display direction of the enlarged virtual image). Those skilled in the art is easy to understand that, the near-eye optical display system used in the electronic apparatus according to the embodiment is not limited to those shown in FIG. 4B to FIG. 4D, and may also adopt other implementation modes such as a projection type ocular glass design.

Figure 5A:
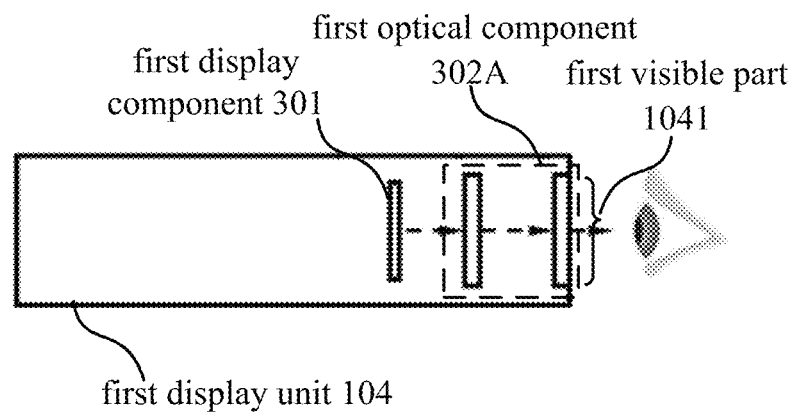
FIGS. 5A to 5C illustrate schematic diagrams of a display unit in the electronic apparatus according to the embodiment of the present disclosure.
Figure 5B:
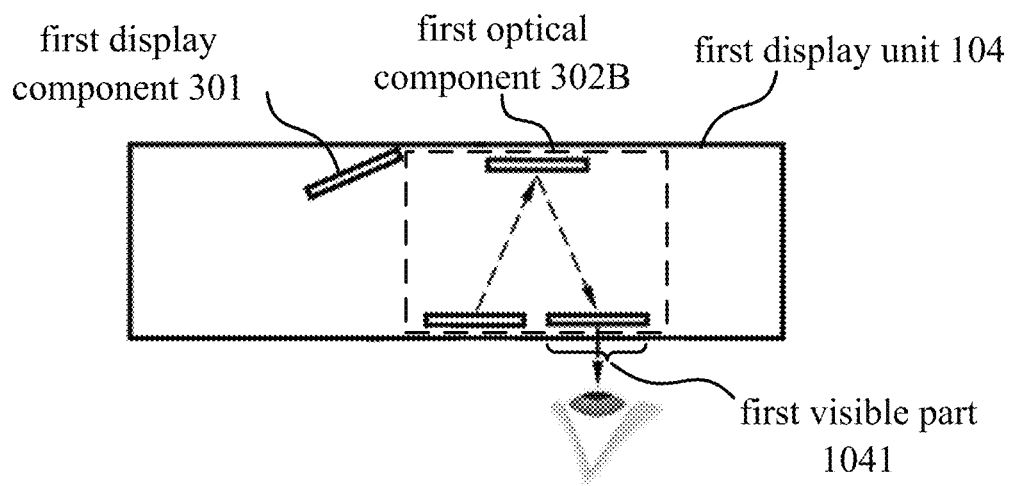
Figure 5C:
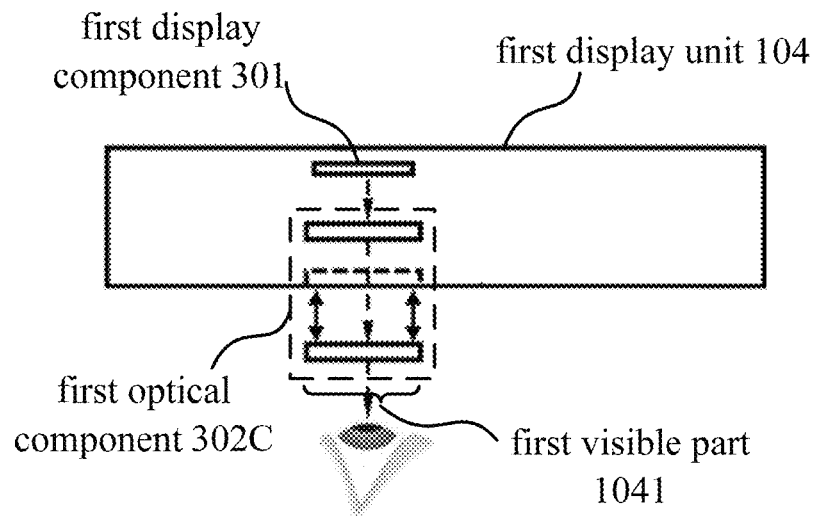

FIGS. 5A to 5C illustrate schematic diagrams of a display unit in the electronic apparatus according to the embodiments of the present disclosure. The first display unit 104 in the electronic apparatus 100 according to the embodiment adopts the above near-eye optical display system as described with reference to FIG. 4A to FIG. 4D. The first display unit 104 includes a first display component 301 and a first optical component 302 (the first optical component 302A to 302C in FIGS. 5A to 5C), and the first display component 301 is for displaying the first image. The first optical component 302 is for receiving a light ray corresponding to the first image emitted from the first display component 301 and carrying out the light path conversion to the light ray corresponding to the first image to form the enlarged virtual image corresponding to the first image.

In particular, in FIG. 5A, the first display component 301 is a micro display, and the first optical component 302A is formed by the lens group. The lens group forms the enlarged virtual image corresponding to the first image displayed by the first display component 301.

In FIG. 5B, the first display component 301 is also the micro display, and the first optical component 302B is formed by optical devices carrying out multiple reflections in the apparatus. In this case, as compared to the first optical component 302A as shown in FIG. 4A, a size of a space required by the first display unit 104 can be saved, so as to facilitate design and manufacture of more miniaturized electronic apparatus.

In FIG. 5C, the first display component 301 is also the micro display, and the first optical component 302C is formed by zoom lens carrying out flex zooming driven by a driving unit (not shown) in the apparatus. In this case, as compared to the first optical component 302A as shown in FIG. 5A, a size of the enlarged virtual image displayed by the first display unit is adjusted dynamically through zooming, so as to satisfy different requirements of the user.

As shown in FIG. 5A to 5C, an area in which the user actually observes a display of an image content of the first display unit 104 is the above first visible part 1041 described with reference to FIG. 2A and FIG. 2B.

In the above electronic apparatus 100 described with reference to FIG. 5A to FIG. 5C, at least part of the first optical component 302 is a component in a direction outward the annular space or the approximate annular space and whose light transmittance satisfies a predetermined condition. At least part of the first optical component 302 is an area corresponding to the display image at the time of displaying. More generally, a light transmittance of the electronic apparatus 100 satisfies the predetermined condition in a direction outward the annular space or the approximate annular space corresponding to the at least part of the first optical component 302. In particular, as shown in FIG. 4D, the electronic apparatus 100 corresponds to a part of the light guide sheet 207 in the display direction in which at least part of the first optical component 302 is the enlarged virtual image. A light transmittance of a part of the light guide sheet 207 watched by eyes of the user directly satisfies the predetermined condition, and light transmittances of parts corresponding to the micro display unit 201 and the lens group 206 not watched by eyes of the user directly need not to satisfy the predetermined condition. The predetermined condition is that the light transmittance is larger than or equal to a predetermined value. For example, the predetermined value is 30%. The predetermined value is 70%. Thus, the user can observe his own skin through the electronic apparatus 100.

Back to FIG. 2A and FIG. 2B, the configuration of the electronic apparatus 100 is further described.

More particularly, as shown in FIG. 2A and FIG. 2B, the first detecting unit 106 is arranged on the body device 101. The processing unit 103 is for executing the detection control. The first detecting unit 106 is for detecting the first parameter in the detection area. More particularly, the first detecting unit 106 detects the first parameter under the detection control executed by the processing unit 103. In the electronic apparatus 100 shown in FIG. 2A, the first detecting unit 106 is arranged on the body device 101. However, those skilled in the art are easy to understand that the present disclosure is not limited thereto. For example, in the electronic apparatus 100 as shown in FIG. 2B, the first detecting unit 106 is also arranged on the fixing device 102, as long as the detection area of the first detecting unit at least partially overlaps with the watching area of the first visible part 1041.

One or more first detecting units 106 are provided in the electronic apparatus 100, and the first detecting unit 106 is provided at respective positions on the electronic apparatus 100.

More particularly, when the electronic apparatus 100 includes a plurality of first detecting unit 106, it is obvious that, the first detecting unit 106 is provided on the body device 101 and/or the fixing device 102 respectively.

However, when the electronic apparatus 100 includes only one first detecting unit 106, since the first detecting unit 106 is constituted by a plurality of independent functional modules, these functional modules are also provided on the body device 101 and/or the fixing device 102 respectively, that is, the single first detecting unit 106 are also provided on the body device 101 and/or the fixing device 102. For example, when the first detecting unit 106 is the parallax graph capturing unit such as a binocular camera head, if the parallax graph capturing unit is understood as including only the lens group in narrow sense, the first detecting unit 106 is provided on the body device 101 or the fixing device 102. In contrary, if the parallax graph capturing unit is understood as including the functional modules such as the lens group, the internal imaging unit and a shutter button or the like in a broad sense, it is obvious that these different functional modules are provided on the body device 101 and/or the fixing device 102 respectively.

As explained in the above, the first display unit 104 is the near-eye optical display system, that is, only when the eyes of the user is very close to the first display unit 104, the user can watch the enlarged virtual image corresponding to the first image from the first visible area of the first display unit 104. It is obvious that, in the embodiment, it wishes to control turning on and off of the first display unit 104 reasonably based on the above-described principle, that is, the display is turned on when the eyes of the user approach the electronic apparatus; And the display is turned off when the eyes of the user is away from the watch.

For this reason, the threshold distance can be set according to a normal watching distance of the near-eye optical display system (i.e., the watching area), and whether the user enters into the normal watching distance is detected by the proximity sensor. For example, after the electronic apparatus 100 starts, if the user does not operate the electronic apparatus in a short time, the electronic apparatus 100 is made to turn off the display of the first display unit 104 in order to save the power consumption. When the first display unit 104 is in the off-status, if it decides that the relative distance between the user and the first visible part is less than or equal to the threshold distance according to the first parameter obtained by the proximity sensor, that is, if the user enters into the normal watching area of the near-eye optical display system, the processing unit 103 controls the first display unit 104 to switch from the off-status to the on-status.

In contrary, when the first display unit 104 is in the on-status, if it decides that the relative distance is larger than the threshold distance, that is, if the user leaves the normal watching area of the near-eye optical display system, the processing unit 103 controls the first display unit 104 to switch from the on-status to the off-status, it is obvious that this be because at this time, the user can't watch the enlarged virtual image normally, thus turning off the display of the near-eye optical display system can reduce meaningless power consumption in the electronic apparatus.

For this reason, after the electronic apparatus 100 starts, if the user selects a function of controlling the display status of the first display unit 104 automatically, the processing unit 103 activates the first detecting unit 106 to enter into a detection status.

Thus it can be seen, according to the electronic apparatus of the embodiment, by using a display of the enlarged virtual image including display components and optical system, image or video display having larger size and higher resolution is implemented without being limited by a size of the wearable electronic apparatus such as the smart watch itself. At the same time, the electronic apparatus has lower power consumption as compared to a mini projector for displaying larger image, and is not limited by using environment, and provides good using privacy. Further, the electronic apparatus further implement a control suitable for the display status of the near-eye optical display system of the wearable electronic apparatus by using a parameter detection operation including various kinds of detecting units, so as to provide optimal user experience to various kinds of usages of the electronic apparatus.

It needs to explain that, though it describes by taking that the processing unit controls the display status of the first display unit 104 according to only the first parameter obtained by the first detecting unit 106 as example, the present disclosure is not limited thereto. Alternatively, the processing unit further turns on or off the first display unit based on other control parameters. For example, the processing unit further counts the time of the user leaving the normal watching area of the near-eye optical display system, and control the first display unit to switch from the on-status to the off-status when it decides that the user leaves the normal watching area of the near-eye optical display system for more than a predetermined time (for example, 5 second). Thus, when the eyes of the user leaves the normal watching area of the near-eye optical display system instantly due to reasons such as hand flicker or the like, the display of the near-eye optical display system would be turned off immediately, so that the system neglects over-frequent operations to avoid frequent switch of the display unit which causes reduction of lifetime.

The above embodiment provides a display status control mode of the electronic apparatus, which is able to detect whether the user enters into the watching area of the first visible part through the first detecting unit (for example, the proximity sensor) in the electronic apparatus, to decide whether to turn on the display of the first display unit, so as to implement the automatic display control of the first display unit and reduce manual operation of the user.

However, since an ordinary proximity sensor can't distinguish that whether the target object closer to the electronic apparatus is the user or other interfering substance well, it may result in miss on or miss off of the display unit, which brings inconvenience to the user.

For example, when the electronic apparatus is the smart watch, the user usually wears the smart watch on his wrist. At this time, if the user wears a long sleeve cloth, in case that the eyes of the user don't get close to the smart watch, the proximity sensor generates an erroneous decision due to block of the sleeve, and regard that the user enters into the watching area of the first visible part incorrectly, so as to turn on the first display unit in error to consume electric power of the electronic apparatus in vain.

For this reason, in the following embodiment, a sensor which can distinguish attributes of the target object can be used as the first detecting unit to avoid occurrence of erroneous decision. That is, at this time, the first detecting unit is a detecting unit which is able to distinguish human body and other obstacle object.

For example, in one embodiment, the first detecting unit 106 includes a touch control sensing unit for generating electric current change of different intensities as the first parameter in response to a good conductor approaching or contacting with the detection area.

In particular, the first detecting unit 106 is a high accuracy capacitive proximity sensor which is able to not only detect the electric current change caused when the human body contacts with the sensor but also detect the electric current change caused when the human body approaches the sensor to a certain degree. That is, the first detecting unit 106 uses a capacitive touch control sensing to record whether the user enters into the watching area of the first visible part.

In principle, the capacitive proximity sensor is very similar to an ordinary capacitive touch screen. In the capacitive touch screen, an event occurred when the screen is touched is referred as a touch event. A capacitive touch is operated by a X-Y electrode lattice covering on the screen and applies a voltage thereon. When a finger gets close to the electrode, the capacitance changes and can be measured. By comparing measured values of all electrodes, a location point of the finger can be positioned accurately. Similarly, a suspend touch control is implemented by running self-capacitance and mutual capacitance on a capacitive touch sensor at the same time. Wherein, the mutual capacitance is for implementing a normal touch sensing including multi-point touch control. And the self-capacitance is for detecting the finger hovering above the sensor. By using the conventional capacitive touch sensor, a threshold of touch control is reduced, and it is able to recognize the suspend touch.

Based on the above-described principle, since the sleeve of the clothing is not a good conductor, when the target object is the sleeve of the clothing but not the human body, it can't cause the electric current change to be generated in the detection area, thus the first detecting unit 106 wouldn't generate the first parameter representing that the human body approaches the first visible part, and in turn the processing unit 103 wouldn't switch the display status of the first display unit 104.

In contrary, when the target object is the user himself, with the eyes of the user approach the first detecting unit 106, it absorbs a certain amplitude of electric current from approaching position, and the nearer between the eyes of the user and the first visible part, the larger the degree of electric current change caused is, so that when the amplitude of the electric current change exceeds a certain threshold, it proves that the eyes of the user have already entered into the watching area of the first visible part, and at this time, the processing unit 103 can turn on the display of the first display unit 104. Further, with the eyes of the user are away from the first detecting unit 106 gradually, the degree of the electric current change caused becomes smaller, so that when the degree of the electric current change is less than a certain threshold, it proves that the eyes of the user have already left the watching area of the first visible part, and at this time, the processing unit 103 can select to turn off the display of the first display unit 104 directly based on setting of the user or further decide other parameters.

Thus it can be seen, the electronic apparatus according to the embodiment avoids a case of the first detecting unit detecting approach of other objects than the human body as approach of the user erroneously by using a human body proximity sensor, so as to avoid the electric power of the electronic apparatus to be consumed in vain due to the erroneous detection.

Though the case of avoiding the erroneous detection to occur by using the human body proximity sensor as the first detecting unit is described in the above embodiment, the present disclosure is not limited thereto.

In an alternative embodiment, other than the first detecting unit 106, one or more other detecting units can be further provided in the electronic apparatus 100 to detect other one or more parameters related to the electronic apparatus, so as to be as further basis of controlling the first display unit to be turned on or off.

Figure 6:
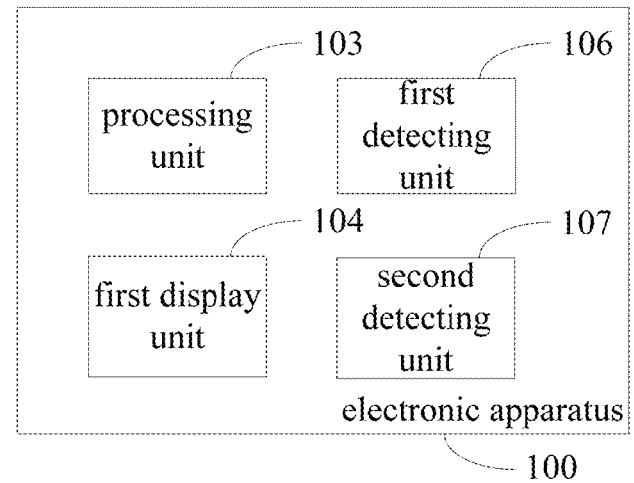
FIG. 6 illustrates a functional block diagram of an electronic apparatus according to another embodiment of the present disclosure.

FIG. 6 illustrates a functional block diagram of an electronic apparatus according to another embodiment of the present disclosure.

As shown in FIG. 6, the electronic apparatus 100 according to the embodiment includes: the processing unit 103, the first display unit 104 and the first detecting unit 106. In addition to theses, the electronic apparatus 100 also includes: a second detecting unit 107 for detecting a second parameter related to the electronic apparatus 100, and the second parameter has different type from the first parameter.

For this reason, the second detecting unit 107 is a detecting unit following various kinds of collecting principal, as long as the second parameter obtained thereof has different type from the first parameter obtained by the first detecting unit 106, so as to make the processing unit 103 to be able to control the first display unit to switch the status according to at least a combination of the first parameter and the second parameter, that is, make the processing unit 103 to be able to decide whether the status of the display of the first display unit are switched based on parameters of at least two dimensions, to avoid erroneous operation.

In the first embodiment, erroneous operation is avoided based on an assumption that the user uses the first display unit only when the electronic apparatus is in a no-motion state.

For example, a second detecting unit 107 includes a motion sensor for detecting current motion amplitude of the electronic apparatus as the second parameter. In particular, the second detecting unit 107 is essentially an acceleration sensor (or referred as an accelerometer) which is able to detect current acceleration of the electronic apparatus in a certain direction.

In practice, the acceleration sensor is able to measure a linear acceleration of a carrier (i.e., the electronic apparatus). For example, when the electronic apparatus is the wristlet type electronic apparatus worn on the wrist of the user (for example, the smart watch), the accelerometer decides an acceleration of a motion of hand of the user by sensing an acceleration of the electronic apparatus itself, so as to estimate a physical environment of the electronic apparatus, and estimate whether the user wishes to watch the first display unit eventually.

In a first scene, in case of deciding that the motion amplitude is larger than or equal to an amplitude threshold, when the first display unit is in the first status, the processing unit controls the first display unit to maintain in the first status.

In particular, if the accelerometer detects that the motion amplitude of the electronic apparatus is relatively large, it decides that the user is likely doing exercise (for example, the user in running or walking) according to practice of life, and it generally regard that the user does not need to watch the first display unit 104 at this time. Therefore, at this time, if the processing unit 103 decides that the first display unit 104 is not turned on, even when the user enters into the watching area of the first visible part of the first display unit 104, the processing unit 103 does not turn on the first display unit 104. In contrary, if the processing unit 103 decides that the first display unit 104 has already been turned on, it indicates that it may be an intentional action of the user, for example, the user is watching the electronic apparatus at the time of walking, therefore, even if the accelerometer decides that the motion amplitude is larger than or equal to the threshold amplitude, the processing unit 103 does not need to turn off the first display unit 104 forcedly.

It needs to explain that, when the user is taking a transport appliance (for example, a bus), due to movement of the transport appliance, it may cause the motion amplitude of the electronic apparatus 100 being larger than or equal to the threshold amplitude. However, at this time, the user is likely to wish to turn on the first display unit 104 in the transport appliance to use the electronic apparatus 100, and this is because an external motion of the transport appliance does not influence a normal usage of the electronic apparatus 100 by the user.

For this reason, the processing unit 103 further analyzes a motion mode of the electronic apparatus to decide whether the motion mode conforms to a preset mode. For example, the processing unit 103 analyzes a motion direction and the motion amplitude of the electronic apparatus, to decide whether the movement of the electronic apparatus conforms to a certain rule, so as to decide whether the user carrying the electronic apparatus is in the transport appliance. When it decides that the user is in the transport appliance, the processing unit 103 generates prompt information to prompt the user to disable a maintaining off function of the first display unit. Alternatively, the electronic apparatus 100 further includes a cooperating unit (not shown) which is able to communicate with a vehicle-mounted system in the transport appliance, to know that the user is in the transport appliance. At this time, the cooperating unit notifies the processing unit 103 to generate the prompt information to prompt the user to disable the maintaining off function of the first display unit, so that the user can use the electronic apparatus normally.

Further, when the accelerometer detects that the motion amplitude of the electronic apparatus is relatively large, if the first display unit 106 has already been in an on-status, the processing unit 103 also generates prompt information to prompt the user that the electronic apparatus is shaking and suggest the user to turn off the display of the first display unit in order to protect vision.

In a second scene, in case of deciding that the motion amplitude is less than a threshold amplitude, when the first display unit is in the second status, if it decides that the relative distance is larger than the threshold distance according to the first parameter, the processing unit controls the first display unit to switch from the second status to the first status. Or when the first display unit is in the first status, if it decides that the relative distance is less than or equal to the threshold distance according to the first parameter, the processing unit controls the first display unit to switch from the first status to the second status.

In particular, if the accelerometer detects that the motion amplitude of the electronic apparatus is relatively small, it decides that the user does not do any movement according to practice of life, and is likely to need to watch the first display unit 104 at any time. Therefore, if the processing unit 103 decides that the first display unit 104 is not turned on, when the user enters into the watching area of the first visible part of the first display unit 104, the processing unit 103 turns on the first display unit 104. In contrary, if the processing unit 103 decides that the first display unit 104 has already turned on, when the user leaves the watching area of the first visible part of the first display unit 104, the processing unit 103 turns off the first display unit 104.

Thus it can be seen, according to the electronic apparatus of the embodiment, in addition to detecting the relative distance between the eyes of the user and the first visible part, it further detects the current motion amplitude of the electronic apparatus, and base on the following assumption (i.e., when the electronic apparatus is in the motion state, the user does not wish to use the first display unit; And when the watch is in non-motion state, on or off of the first display unit is controlled according to the relative distance), switch of the status of the first display unit is controlled through the above-described parameters of two different dimensions to obtain a more accurate automatic operation.

In the second embodiment, erroneous operation is avoided based on an assumption that the user uses the first display unit only when the electronic apparatus subjects a predetermined motion mode. For example, the display status of the first display unit is switched only when it decides that the motion mode subjected by the electronic apparatus satisfies a predetermined condition and further the eyes of the user approaches the first visible part in company with the above-described motion of the electronic apparatus so as to make the relative distance there between being less than or equal to the predetermined threshold.

For example, the second detecting unit 107 includes a motion sensor for detecting a translational motion in a first direction of the electronic apparatus and a rotating motion around a first axis, to determine the motion mode of the electronic apparatus as the second parameter. In particular, the second detecting unit 107 is essentially a multi-axis gyroscope (for example, a triaxiality gyroscope) which is able to detect positions, tracks of movement and accelerations or the like in 6 spatial directions of the electronic apparatus.

In practice, the multi-axis gyroscope can measure the positions, the tracks of movement and the accelerations or the like in different spatial directions of the carrier (i.e., the electronic apparatus), so as to decide the electronic apparatus subjects to which kinds of motion mode. For example, when the electronic apparatus is the wristlet type electronic apparatus worn on the wrist of the user (for example, the smart watch), the multi-axis gyroscope decides the motion mode of the motion of the hand of the user by sensing the motion of the electronic apparatus itself, so as to estimate whether the user moves the electronic apparatus in order to watch the first display unit eventually. Generally, the user usually uses the electronic apparatus by actions of lifting his arm and rotating the arm to make the first display unit towards his eyes.

In a first scene, in case of deciding that the motion mode does not match a predetermined mode, when the first display unit is in the first status, the processing unit controls the first display unit to maintain in the first status.

In particular, it detects whether a motion operation executed by the user to the electronic apparatus is a motion operation of the user wishing to use the electronic apparatus based on a principle that acceleration component of gravity on respective Y directions in a reference coordinate (for example, a three-dimensional system of coordinate) of the electronic apparatus 100 is different in different usage status.

Figure 7:
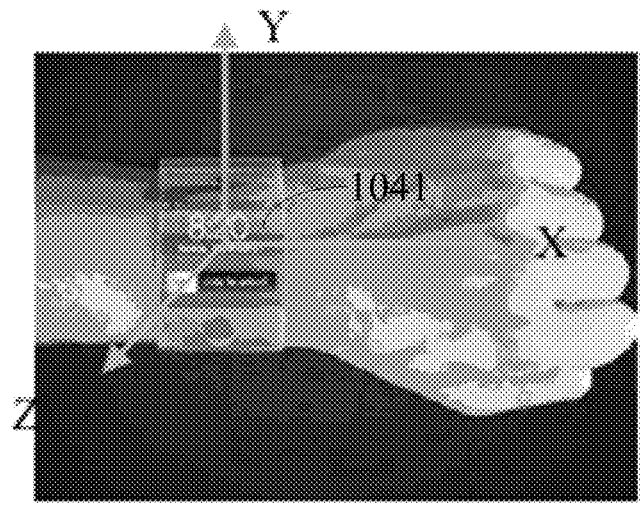
FIG. 7 illustrates a coordinate system constructed based on a first visible area of the electronic apparatus according to the embodiment of the present disclosure.

FIG. 7 illustrates a coordinate system constructed based on the first visible area of the electronic apparatus according to the embodiment of the present disclosure.

As shown in FIG. 7, X-axis, Y-axis and Z-axis constituting the three-dimensional system of coordinate are provided on the electronic apparatus, wherein a plane constituted by the X-axis and Y-axis is parallel to a screen where the first visible area 1041 is, and the Y-axis and direction of acceleration of gravity G is in a line when the first visible area 1041 is placed perpendicular to the ground when the user hand-held the electronic apparatus 100.

In particular, when the user does not use the electronic apparatus 100, he may relax the arm wearing the electronic apparatus 100, thus the electronic apparatus 100 must slide downward to front of the wrist of the user and caught by palm due to a gravity action, thus component in the X-axis of the acceleration of gravity G is the largest, and component in the Y-axis is middle, and component in the Z-axis is the least. In contrary, when the user watches the electronic apparatus 100 as the smart watch, the user needs to lift the arm and rotate the arm to make part of the first visible area 1041 in the electronic apparatus to align with his own eyes, for example, at this time, the first visible area 1041 is perpendicular to a ground plane according to a usage habit of normal user, as shown in FIG. 7. Thus, components of the acceleration of gravity G in the respective axis subject to a series of variation and are fixed to be the largest in the Y-axis, middle in the X-axis and the least in the Z-axis eventually.

If the multi-axis gyroscope detects that the motion mode of the electronic apparatus does not match the predetermined mode through variations of the acceleration of gravity in respective directions, it considers that the user does not need to watch the first display unit 104 but do other actions at this time according to practice of life, for example, the user shakes arm while walking, gives a stretch or picks up something from ground, and so on. Therefore, at this time, if the processing unit 103 decides that the first display unit 104 is not turned on, even when the user enters into the watching area of the first visible part of the first display unit 104, the processing unit 103 does not turn on the first display unit 104.

In a second scene, in case of deciding that the motion mode matches the predetermined mode, when the first display unit is in the second status, if it decides that the relative distance is larger than the threshold distance according to the first parameter, the processing unit controls the first display unit to switch from the second status to the first status. Or when the first display unit is in the first status, if it decides that the relative distance is less than or equal to the threshold distance according to the first parameter, the processing unit controls the first display unit to switch from the first status to the second status.

In particular, if the multi-axis gyroscope detects that the motion mode of the electronic apparatus matches the predetermined mode through variations of the acceleration of gravity in the respective directions, it decides that the user is moving arm so as to watch the first display unit 104 according to practice of life. Therefore, if the processing unit 103 decides that the first display unit 104 is not turned on, when the user enters into the watching area of the first visible part of the first display unit 104, the processing unit 103 turns on the first display unit 104. In contrary, if the processing unit 103 decides that the first display unit 104 has already turned on, when the user leaves the watching area of the first visible part of the first display unit 104, the processing unit 103 turns off the first display unit 104. For example, this case may be that the user lifts arm passing his face and gives a stretch.

Thus it can be seen, according to the electronic apparatus of the embodiment, in addition to detecting the relative distance between the eyes of the user and the first visible part, it further detects the current motion mode of the electronic apparatus, and base on the following assumption (i.e., when the electronic apparatus is in a non-predetermined mode, the user does not wish to use the first display unit; And when the watch is in the predetermined motion mode, on or off of the first display unit is controlled according to the relative distance), the switch of the status of the first display unit is controlled through the above-described parameters of two different dimensions to obtain a more accurate automatic operation.

Further, based on a same principle, other than using the gyroscope, the first detecting unit 106 also includes an angular acceleration sensor or a gravity sensor. Thus, an action of lifting wrist in a gravity direction of the user can be sensed by the gyroscope or the gravity sensor, and an action of turning the wrist of the user is sensed by the angular acceleration sensor, so as to decide whether the motion mode of the electronic apparatus matches the predetermined mode through a combination of these two actions.

In the third embodiment, erroneous operation is avoided by assuming that the user uses the first display unit only when the electronic apparatus is in a predetermined gesture. For example, the display status of the first display unit is switched only when it decides that a current gesture of the electronic apparatus satisfies a predetermined condition and the relative distance between the eyes of the user and the first visible part is less than or equal to the predetermined threshold in the current gesture of the electronic apparatus at the same time.

For example, the second detecting unit 107 includes a gesture sensor for detecting the current gesture of the electronic apparatus as the second parameter. In particular, the second detecting unit 107 is also essentially the multi-axis gyroscope (for example, the triaxiality gyroscope) which is able to detect the positions, the tracks of movement and the accelerations or the like in 6 spatial directions of the electronic apparatus.

In a first scene, in case of deciding that the current gesture does not match the predetermined gesture, when the first display unit is in the first status, the processing unit controls the first display unit to maintain in the first status.

In particular, it detects whether the current gesture of the electronic apparatus is a usage gesture of the user likely to use the electronic apparatus based on a principle that acceleration component of gravity on the respective Y directions in the reference coordinate (for example, the three-dimensional system of coordinate) of the electronic apparatus 100 is different in different usage gesture.

The X-axis, the Y-axis and the Z-axis constituting the three-dimensional system of coordinate are also provide on the electronic apparatus, as shown in FIG. 7.

In particular, as explained in the above, when the user watches the electronic apparatus 100 as the smart watch, the user generally keeps the electronic apparatus being in approximately still status, wherein the first visible area 1041 in the electronic apparatus 100 is substantially perpendicular to the ground to align with the eyes of the user, as shown in FIG. 7. Thus, the component in the Y-axis of the acceleration of gravity G is the largest, the component in the X-axis is middle, and the component in the Z-axis is the least.

If the multi-axis gyroscope detects that the current gesture of the electronic apparatus does not match the predetermined gesture through values of acceleration of gravity in respective directions, it considers that the user does not need to watch the first display unit 104 but is in other still gestures at this time according to practice of life. Therefore, at this time, if the processing unit 103 decides that the first display unit 104 is not turned on, even when the user enters into the watching area of the first visible part of the first display unit 104, the processing unit 103 does not turn on the first display unit 104. In contrary, if the processing unit 103 decides that the first display unit 104 has already been turned on, it indicates that this is likely an intentional action of the user, and the processing unit 103 does not need to turn off the first display unit 104 forcedly.

In a second scene, in case of deciding that the current gesture matches the predetermined gesture, when the first display unit is in the second status, if it decides that the relative distance is larger than the threshold distance according to the first parameter, the processing unit controls the first display unit to switch from the second status to the first status. Or when the first display unit is in the first status, if it decides that the relative distance is less than or equal to the threshold distance according to the first parameter, the processing unit controls the first display unit to switch from the first status to the second status.

In particular, if the multi-axis gyroscope detects that the current gesture of the electronic apparatus matches the predetermined gesture through values of the acceleration of gravity in the respective directions, it decides that the user is in a specific gesture preparing to watch the first display unit 104 according to practice of life. Therefore, if the processing unit 103 decides that the first display unit 104 is not turned on, when the user enters into the watching area of the first visible part of the first display unit 104, the processing unit 103 turns on the first display unit 104, for example, the arm of the user may keep still and head is moved to approach the electronic apparatus at this time. In contrary, if the processing unit 103 decides that the first display unit 104 has already turned on, when the user leaves the watching area of the first visible part of the first display unit 104, the processing unit 103 turns off the first display unit 104.

Thus it can be seen, according to the electronic apparatus of the embodiment, in addition to detecting the relative distance between the eyes of the user and the first visible part, it further detects the current gesture of the electronic apparatus, and base on the following assumption (i.e., when the electronic apparatus is in a non-predetermined gesture, the user does not wish to use the first display unit; And when the watch is in the predetermined gesture, on or off of the first display unit is controlled according to the relative distance), the switch of the status of the first display unit is controlled through the above-described parameters of two different dimensions to obtain a more accurate automatic operation.

Though in the above three embodiments, it describes by taking the motion amplitude, the motion mode or the current gesture of the electronic apparatus as the second parameter as example, the present disclosure is not limited thereto. For example, simply, by detecting a motion distance of the electronic apparatus with respect to the human body and assuming that it indicates that the user is to use the electronic apparatus when the motion distance of the electronic apparatus with respect to the human body exceeds a threshold, switch of the status of the first display unit can be controlled further according to the relative distance between the electronic apparatus and the user.

Further, though the above three separated embodiments explains the status switch control of the first display unit, the present disclosure is not limited thereto. For example, an erroneous operation of the status switch control can be further reduced by combining two or more embodiments.

For example, in one example, whether it needs to turn on a large screen display of a near-eye display is decided by combining all of three steps according to the motion state, the current gesture of the electronic apparatus and the relative distance between the electronic apparatus and the user. Firstly, whether the electronic apparatus is in the motion state is decided by the acceleration sensor, and if it decides that the electronic apparatus is moving, the processing unit 103 does not turn on the first display unit 104. Otherwise, a second step is examined next. Then, current position status of the electronic apparatus is detected continually through the triaxiality gyroscope, and if it decides that the electronic apparatus is in a status as shown in FIG. 7 (i.e., a X-Y plane is perpendicular to the ground plane approximately), the processing unit 103 continues an examination of a third step. Otherwise, the processing unit 103 does not turn on the large screen. At last, the processing unit 103 further detects whether there is target object approaching to decide whether it needs to turn on the first display unit 104 according to the proximity sensor. Thus, through multiple detections, turning on or off the first display unit 104 erroneously can be avoided more accurately.

Figure 8:
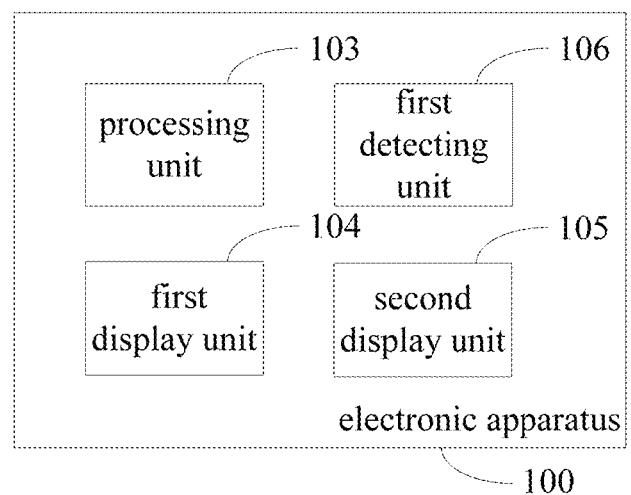
FIG. 8 illustrates a functional block diagram of an electronic apparatus according to another embodiment of the present disclosure.
Figure 9:
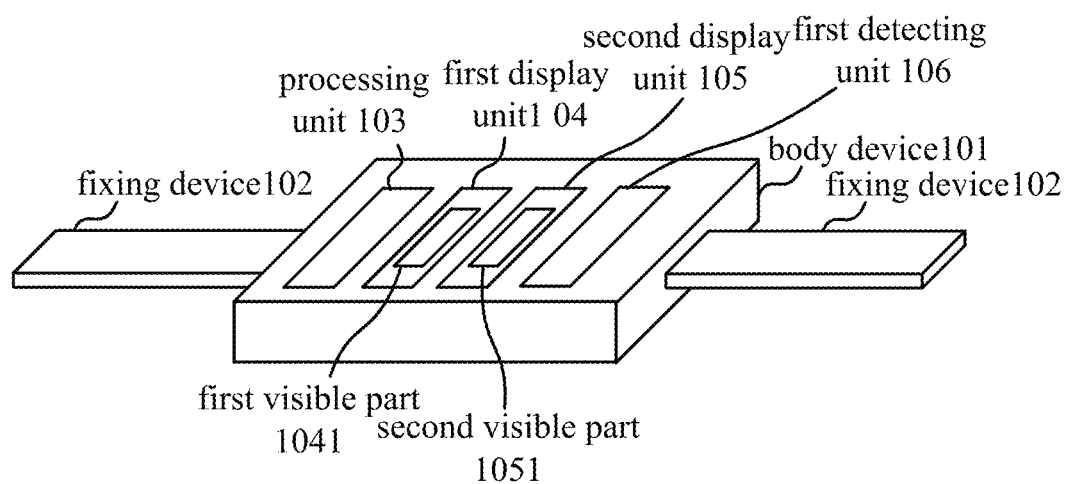
FIG. 9 illustrates a structured block diagram of the electronic apparatus according to another embodiment of the present disclosure.

FIG. 8 illustrates a functional block diagram of an electronic apparatus according to yet another embodiment of the present disclosure. FIG. 9 illustrates a structured block diagram of the electronic apparatus according to yet another embodiment of the present disclosure.

As shown in FIG. 8, as compared to FIG. 1, the electronic apparatus 100 according to another embodiment further includes: a second display unit 105 including a second visible part (or referred as a second visible are) and for displaying a second image, and the second visible part is a part watched by the user so as to perceive display content thereof in the second display unit.

For example, the second visible part of the second display unit 105 has a watching area, so that only when the eyes of the user is in the watch region, the user can watch the second image generated by the processing unit 103 from the second visible area of the second display unit 105.

As shown in FIG. 8 and FIG. 9, in addition to the first display unit 104, the electronic apparatus 100 also includes the second display unit 105 which is for example arranged on the body device 101. The processing unit 103 is for generating the image to be displayed and executing the display control. The second display unit 105 is for outputting the second image. More particularly, the second display unit 105 outputs the second image generated by the processing unit 103 under the display control executed by the processing unit 103, so as to make the user to be able to perceive the second image through the second visible part. For example, the second image is any types of display data including, but not limited to: an image, a video, a text or even more generally, a graphical user interface of an application or a standby picture of the electronic apparatus 100 or the like.

In the electronic apparatus 100 shown in FIG. 9, the second display unit 105 is arranged on the body device 101. However, those skilled in the art are easy to understand that the present disclosure is not limited thereto. For example, the second display unit 105 is also arranged on the fixing device 102.

The second display unit 105 is the display unit following various kinds of display principals. For example, the second display unit 105 is a normal optical display system including, but not limited to a liquid crystal display unit, an organic electroluminescence display unit, an organic light-emitting diode display unit, an E-Ink type display unit or the like. The second display unit 105 is a display unit having different type from the first display unit 104.

More particularly, the second display unit 105 includes a second visible part 1051, and the second visible part 1051 is a part watched by the user so as to perceive the display content in the second display unit 105. That is, the second display unit 105 includes a plurality of components depending on a principle thereof as described below, and wherein the second visible part 1051 is an area in which the user observes display of image content actually. At this time, a position of the second display unit 105 described above actually refers to a position of the second visible part 1051.

Hereinafter, different configuration examples of the first visible part and the second visible part are described with reference to FIG. 10A to FIG. 10F.

Figure 10A:
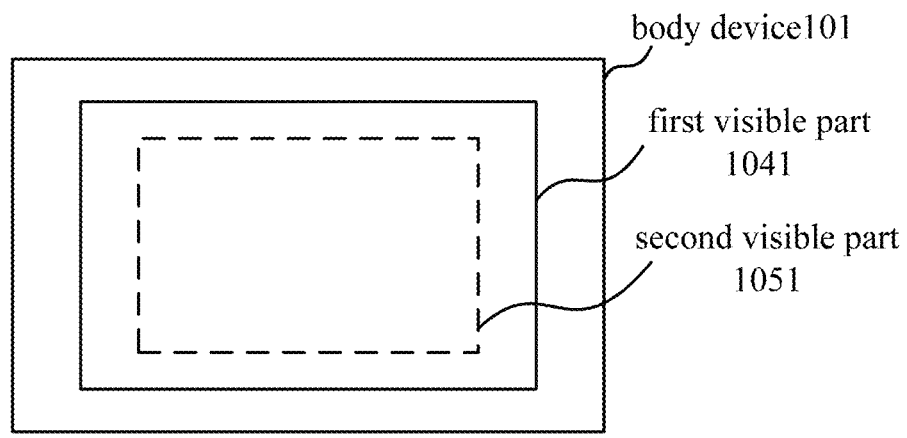
FIGS. 10A and 10B are top view and side view illustrating a first configuration example of a visible part of the electronic apparatus according to the embodiment of the present disclosure respectively.
Figure 10B:
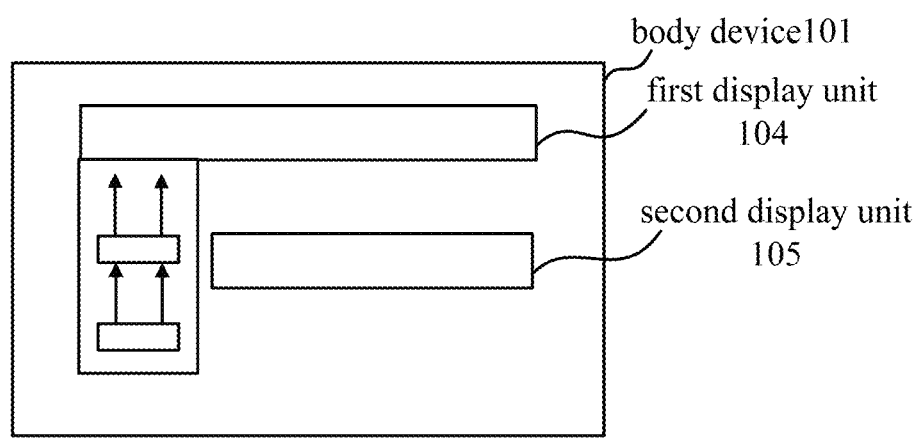

FIGS. 10A and 10B are top view and side view illustrating a first configuration example of a visible part of the electronic apparatus according to the embodiment of the present disclosure respectively.

As shown in FIG. 10A, the first visible part 1041 and the second visible part 1051 have the first configuration example provided overlapped on the body device 101. The present disclosure is not limited thereto, and the first visible part 1041 and the second visible part 1051 is also provided overlapped on the fixing device 102.

FIG. 10B further illustrate a side view of the first configuration example in which the first visible part 1041 and the second visible part 1051 have overlapping configuration. As shown in FIG. 10B, the first display unit 104 is provided with the first visible part 1041 and the second display unit 105 is provided with the second visible part 1051. As shown in the configuration in FIG. 10B, light transmittances of visible parts which is at least at outer side of the annular space or the approximate annular space of the first visible part 1041 and the second visible part 1051 in a direction outward the annular space or the approximate annular space are made to satisfy predetermined conditions. The predetermined condition is that the light transmittance is larger than or equal to a predetermined value (such as 70%). In examples as shown in FIG. 10A and FIG. 10B, the first visible part 1041 is made to be at the outer side. The present disclosure is not limited thereto, the second visible part 1051 is also made to be in the outer side. By making the light transmittance of the first visible part 1041 to be larger than or equal to the predetermined value, only one of the first visible part 1041 and the second visible part 1051 is made to display, and the visible part which does not display would influence display function of the visible part which displays, so as to implement a more compact configuration.

Figure 10C:
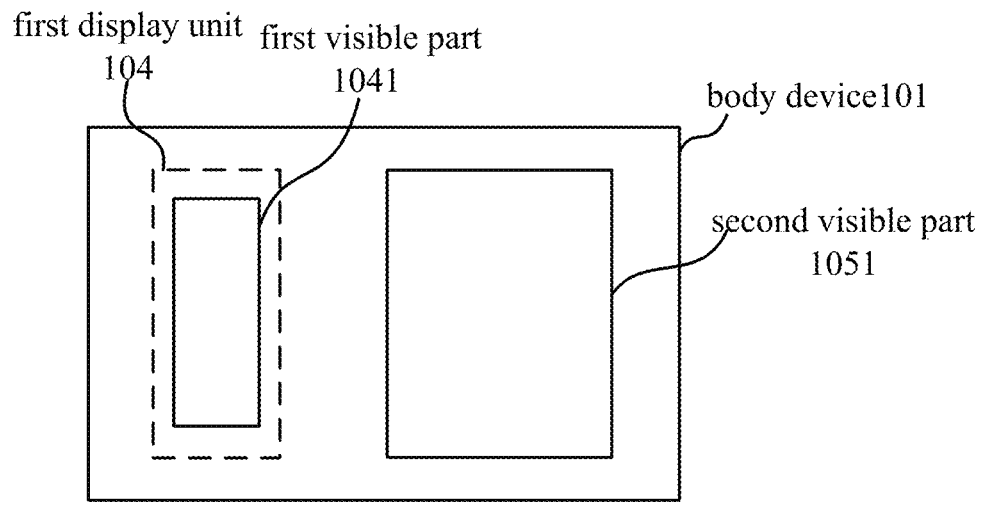
FIGS. 10C and 10D are top view and side view illustrating a second configuration example of a visible part of the electronic apparatus according to the embodiment of the present disclosure respectively.
Figure 10D:
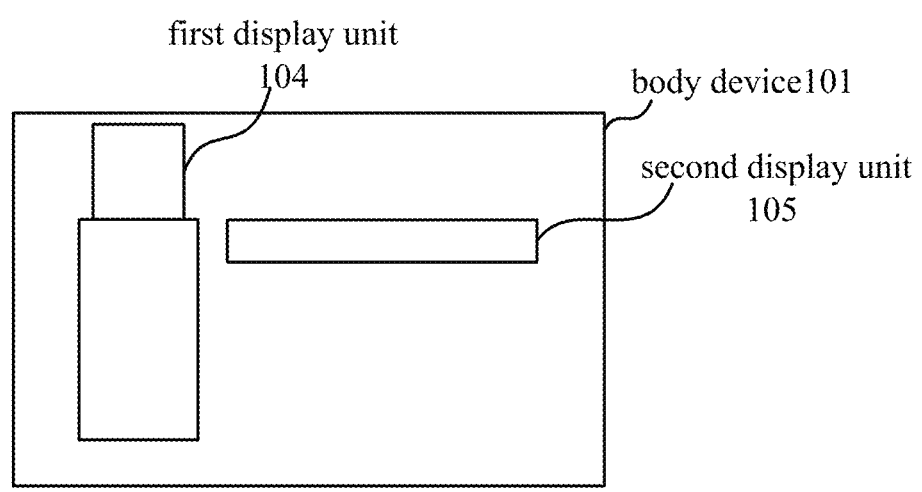

FIGS. 10C and 10D are top view and side view illustrating a second configuration example of a visible part of the electronic apparatus according to the embodiment of the present disclosure respectively.

As shown in FIG. 10C, the first visible part 1041 and the second visible part 1051 have the second configuration example of being provided on the body device 101 or the fixing device 102 adjacent to each other. In FIG. 10C and FIG. 10D, the first visible part 1041 and the second visible part 1051 are provided in the body device 101 adjacent to each other. The present disclosure is not limited thereto, the first visible part 1041 and the second visible part 1051 is on the body device 101 and the fixing device 102 respectively, and a pitch between the first visible part 1041 and the second visible part 1051 is less than a threshold (for example 1 cm).

FIG. 10D further illustrate a side view of the first configuration example in which the first visible part 1041 and the second visible part 1051 have overlapping configuration. As shown in FIG. 10D, the first display unit 104 provided with the first visible part 1041 and the second display unit 105 provided with the second visible part 1051 are arranged adjacent to each other as shown in FIG. 10D, and display directions of the first visible part 1041 and the second visible part 1051 are both a direction outward the annular space or the approximate annular space.

Figure 10E:
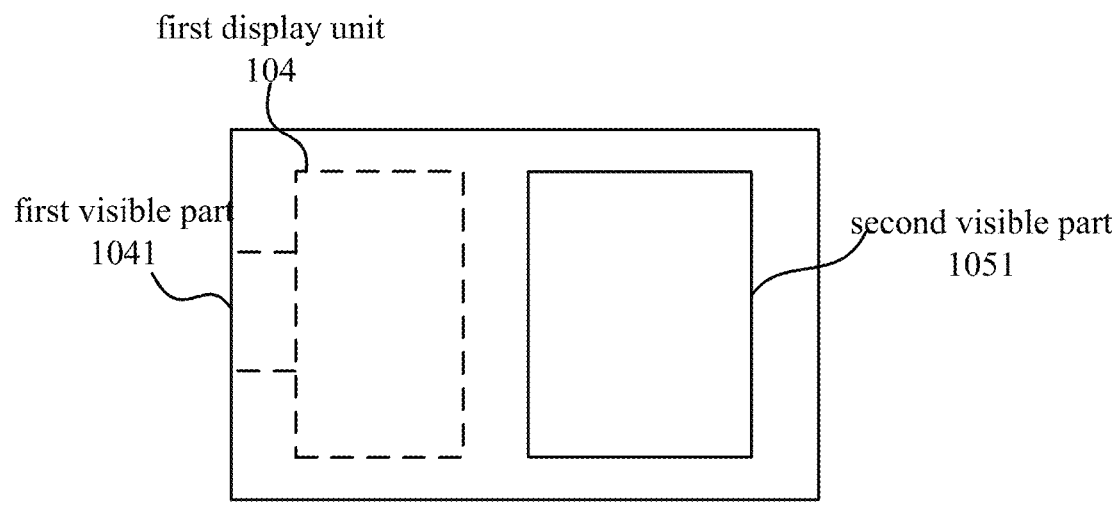
FIGS. 10E and 10F are top view and side view illustrating a third configuration example of a visible part of the electronic apparatus according to the embodiment of the present disclosure respectively.
Figure 10F:
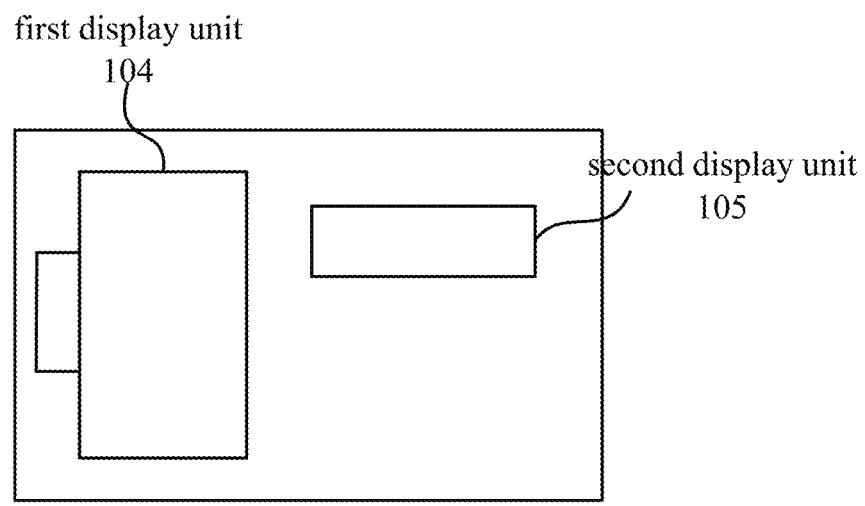

FIGS. 10E and 10F are top view and side view illustrating a third configuration example of a visible part of the electronic apparatus according to the embodiment of the present disclosure respectively.

As shown in FIG. 10E, the first visible part 1041 and the third visible part 1051 have the third configuration example of being provided on the body device 101 or the fixing device 102 adjacent to each other. Being different the second configuration example shown in FIG. 10C and FIG. 10D, as shown in FIG. 10F, a display direction of one of the first visible part 1041 and the second visible part 1051 is the direction outward the annular space or the approximate annular space, and a display direction of another one of the first visible part 1041 and the second visible part 1051 is a direction perpendicular to the direction outward the annular space or the approximate annular space.

Hereinafter, an appearance effect example of the electronic apparatus at the time of adopting the visible part shown in FIG. 10C and FIG. 10D is described in detail with reference to FIG. 11.

Figure 11:
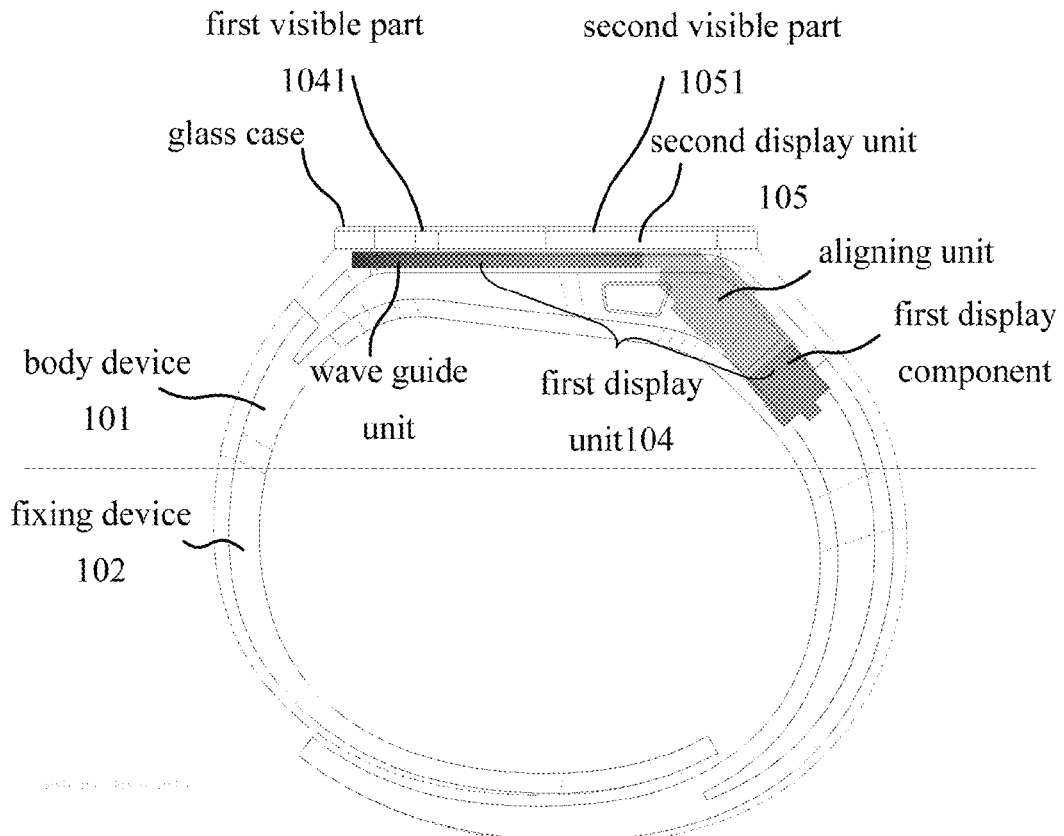
FIG. 11 illustrates a side view of an appearance of the electronic apparatus according to the embodiment of the present disclosure.

FIG. 11 illustrates a side view of an appearance of the electronic apparatus according to the embodiment of the present disclosure.

As shown in FIG. 11, the first display unit 104 is the near-eye optical display system, and the first visible part 1041 is at least a part of surface of exit light ray of the first optical component, and the first visible part 1041 is provided in the body device 101. Further, the second display unit 105 is a normal optical display system, and the second visible part 1051 is an area corresponding to a second display screen of the second display unit 105.

It needs to explain that, though in FIG. 11, the first display component and the first optical component (including a collimation unit and a wave guide unit) are provided in the body device, the present disclosure is not limited thereto. For example, the first optical component is provided across the body device 101 and the fixing device 102, and the first display component is provided in the body device 101.

In one embodiment, as shown in FIG. 11, due to display principles of a normal display and a near-eye display, a size of the second visible part 1051 is larger than a size of the first visible part 1041. Therefore, when a distance between the user and the body device is a second distance (for example, the second distance may have a farther distance value), the size of the second image presented according to a second display effect in the second visible part 1051 watched by the user is larger than the size of the first image presented according to a first display effect in the first visible part 1041 perceived by the user.

Generating above phenomena is caused by the following reason: when the user (or referred as a watcher) is positioned at a specific position away from the electronic apparatus (the second distance at which the user is not able to perceive the virtual image) to watch, the size of the second image presented according to the second display effect in the second visible part 1051 watched by the user is equal to the size of the second visible part 1051, and the first image presented according to the first display effect in the first visible part 1041 perceived by the user only generates a light spot since it does not form the virtual image as expected, so the size thereof is also approximately equal to the size of the first visible part 1041.

In another embodiment, the second display unit 105 includes the second display screen having a second size which is equal to the size of the second visible part. At the same time, the first display unit 104 includes a first display screen having a first size which is less than the size of the first visible part.

Due to display principles of the normal display and near-eye display, when a distance between the user and the body device is a first distance (for example, the first distance may have a closer distance value), the size of the second image presented according to the second display effect in the second visible part watched by the user is equal to the size of the second visible part. And when the distance between the user and the body device is the first distance (it assumes that it is the specific position at which the user is able to perceive the virtual image), the size of the first image presented according to the first display effect in the first visible part perceived by the user is larger than the size of the first visible part.

Generating above phenomena is caused by the following reason: when the user is positioned at a specific position closer to the electronic apparatus (the first distance at which the user is able to perceive the virtual image) to watch, the size of the second image presented according to the second display effect in the second visible part 1051 watched by the user is still equal to the size of the second visible part 1051, and the size of the first image presented according to the first display effect in the first visible part 1041 perceived by the user is larger than the size of the first visible part 1041 since it forms the enlarged virtual image. Depending on setting of the first display unit 104, when the user is just position at the specific position of the electronic apparatus 100 to watch, it is even possible that, the size of the virtual image of the first image presented according to the first display effect in the first visible part 1041 perceived by the user likely generates a size of a real image which is several or even several tens of times of the second image.

Thus it can be seen, in the electronic apparatus according to the embodiment, the second display unit outputs the real image corresponding to the display image, so that the user positioned at the second distance of the electronic apparatus is able to watch the real image in the second visible part, and the first display unit is for outputting the virtual image corresponding to the display image, so that the user positioned at the first distance of the electronic apparatus is able to perceive the virtual image in the first visible part, wherein, the size of the real image watched is equal to the size of the second visible part, and the size of the virtual image perceived is larger than the size of the first visible part. Therefore, the electronic apparatus can provide an image or video display having larger size and higher resolution without being limited by the size of the wearable electronic apparatus itself such as the smart watch.

In order to carry out display control in the electronic apparatus having dual display units, the first detecting unit 106 detects the first parameter in the detection area, and the first parameter is for indicating the relative distance between the target object and the first visible part of the first display unit and the second visible part of the second display unit 105. More particularly, the first detecting unit 106 detects the first parameter in the detection area under a detection control executed by the processing unit 103.

In order to make the first detecting unit 106 to be able to detect the relative distance between the user and the first display unit 104 and the second display unit 105 to decide whether the user carries out the watching action to the first display unit 104 and the second display unit 105 and to automatically control the display switching of the first display unit 104 and the second display unit 105 accordingly, the detection area of the first detecting unit 106 at least partially overlaps with the watching area of the first visible part and the watching area of the second visible part. That is, the first detecting unit 106 at least detects whether the user is close to the first visible part of the first display unit 104 and whether the user is close to the second visible part of the second display unit 105 in an overlapping area between the detection area and the two watching areas.

For example, in one embodiment, the first display unit 104 is the near-eye optical display system, and the second display unit 105 is the normal optical display system. As explained in the above, depending on different display principles, the watching area of the first display unit 104 is relatively narrow and the watching distance is nearer, and the watching area of the second display unit 105 is relative wide and the watching distance is farther. That is, only when the eyes of the user is very close to the first display unit 104, the user can watch the enlarged virtual image corresponding to the first image in the first visible area of the first display unit 104, and as long as the eyes of the user keeps a normal watching distance (for example, 10 cm) from the first display unit 104 and an angle between a line of sight of the user and the second visible area of the second display unit 105 is larger than a predetermined angle (for example, 0 degree), the user can watch a normal real image corresponding to the first image in the second visible area of the second display unit 105.

Based on the above-described display control principle, in the embodiment, the first detecting unit 106 is used to detect the first parameter in the detection area, and the first parameter is for indicating the relative distance between the target object and the first visible part and the second visible part. Then, display of the first display unit 103 and the second display unit 104 is controlled according to at least the first parameter.

For example, in case that the user moves the electronic apparatus 100 closer to himself, when it decides that the user has already entered into the watching area of the second visible part of the second display unit 105 from a farther position according to the first parameter, the display of the second display unit 105 is turned on. Next, when it decides that the user approaches the electronic apparatus continually and has already further entered into the watching area of the first visible part of the first display unit 104 according to the first parameter, the display of the first display unit 104 is turned on. At this time, in order to save power consumption of the electronic apparatus, the display of the second display unit 105 is turned off.

In contrary, in case that the user moves the electronic apparatus 100 away from himself, when it decides that the user has already left the watching area of the first visible part of the first display unit 104 and entered into the watching area of the second visible part of the second display unit 105 according to the first parameter, the display of the second display unit 105 is turned on. At this time, in order to save power consumption of the electronic apparatus, the display of the first display unit 104 is turned off. Next, when it decides that the user is away from the electronic apparatus continually and has already further left the watching area of the second visible part of the second display unit 105 according to the first parameter, the display of the second display unit 105 is turned off.

It is obvious that, in order to avoid erroneous operation occurring, one or more other detecting units can also be provided in the electronic apparatus 100 to detect other one or more parameters related to the electronic apparatus, so as to be as further basis of controlling the first display unit and the second display unit to be turned on or off.

Since controlling the first display unit to switch status according to at least the combination of the first parameter and the second parameter is described detailed above, the detailed description thereof is omitted here.

As compared to a conventional technique, by using the electronic apparatus according to the embodiments, the relative distance between the user and the first visible part in the first display unit of the electronic apparatus can be detected, and the display of the first display unit is controlled automatically according to the relative distance. Thus, there provides an automatic status switching manner of the display unit, which avoids the user to intervene, so as to improve the user experience.

Hereinbefore, the electronic device according to the embodiment is described with reference to FIG. 1A to FIG. 11. Hereinafter, a display control method used by the electronic device is described with reference to FIG. 12.

Figure 12:
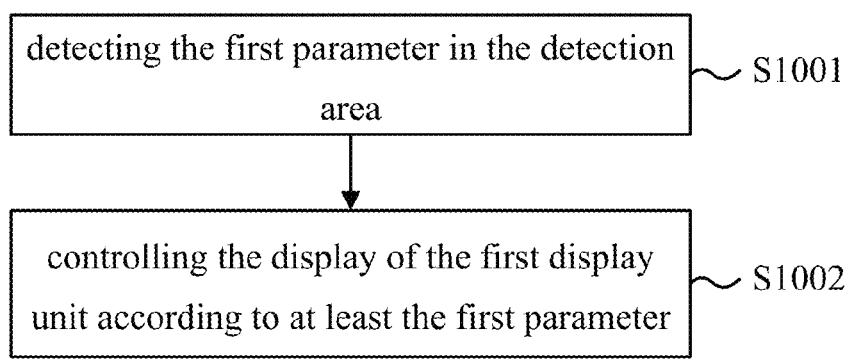
FIG. 12 illustrates a flow chart of a display control method according to the present disclosure.

FIG. 12 illustrates a flow chart according to the embodiment of the present disclosure a display control method according to embodiment of the present disclosure.

The display control method as shown in FIG. 12 is applied in the electronic apparatus shown in FIG. 1. As has been said before, the electronic apparatus includes: the first display unit including the first visible part and for displaying the first image, wherein the first visible part is the part watched by the user so as to perceive the display content thereof in the first display unit; The first detecting unit for detecting the first parameter for indicating the relative distance between the target object and the first visible part in the detection area which is at least partially overlapped with the watching area of the first visible part; And the processing unit for generating the image to be displayed and controlling the display of the first display unit according to at least the first parameter.

The display control method includes: detecting the first parameter in the detection area (step S1001); and controlling the display of the first display unit according to at least the first parameter (step S1002).

In particular, the step S1002 includes: when the first display unit is in the first state, if it decides that the relative distance is less than or equal to the threshold distance according to the first parameter, controlling the first display unit to switch from the first status to the second state, wherein, the power consumption of the first display unit in the first state is lower than the power consumption of the first display unit in the second status.

In one embodiment, detecting the first parameter in the detection area includes: generating the electric current change of different intensities as the first parameter in response to the good conductor approaching or contacting with the detection area.

In one embodiment, the electronic apparatus also includes: the second detecting unit for detecting the second parameter related to the electronic apparatus and having different type from the first parameter, and the display control method also includes: detecting the second parameter related to the electronic apparatus, and controlling the display of the first display unit according to at least the first parameter includes: controlling the first display unit to switch status according to at least the combination of the first parameter and the second parameter.

In one specific example, detecting the second parameter related to the electronic apparatus includes: detecting the current motion amplitude of the electronic apparatus as the second parameter, and controlling the first display unit to switch status according to at least the combination of the first parameter and the second parameter includes: in case of deciding that the motion amplitude is larger than or equal to the threshold amplitude, when the first display unit is in the first status, controlling the first display unit to be maintained at the first status; or in case of deciding that the motion amplitude is less than the threshold amplitude, when the first display unit is in the second status, if it decides that the relative distance is larger than the threshold distance according to the first parameter, controlling the first display unit to switch from the second status to the first status; or when the first display unit is in the first status, if it decides that the relative distance is less than or equal to the threshold distance according to the first parameter, controlling the first display unit to switch from the first status to the second status;

In another specific example, detecting the second parameter related to the electronic apparatus includes: detecting the translational motion in the first direction and the rotating motion around the first axis the electronic apparatus, to determine the motion mode of the electronic apparatus as the second parameter, and controlling the first display unit to switch status according to at least the combination of the first parameter and the second parameter includes: in case of deciding that the motion mode does not match the predetermined mode, when the first display unit is in the first status, controlling the first display unit to be maintained at the first status; or in case of deciding that the motion mode matches the predetermined mode, when the first display unit is in the second status, if it decides that the relative distance is larger than the threshold distance according to the first parameter, controlling the first display unit to switch from the second status to the first status; or when the first display unit is in the first status, if it decides that the relative distance is less than or equal to the threshold distance according to the first parameter, controlling the first display unit to switch from the first status to the second status.

In yet another specific example, detecting the second parameter related to the electronic apparatus includes: detecting the current gesture of the electronic apparatus as the second parameter, and controlling the first display unit to switch status according to at least the combination of the first parameter and the second parameter includes: in case of deciding that the current gesture does not match the predetermined gesture, when the first display unit is in the first status, controlling the first display unit to be maintained at the first status; or in case of deciding that the current gesture matches the predetermined gesture, when the first display unit is in the second status, if it decides that the relative distance is larger than the threshold distance according to the first parameter, controlling the first display unit to switch from the second status to the first status; or when the first display unit is in the first status, if it decides that the relative distance is less than or equal to the threshold distance according to the first parameter, controlling the first display unit to switch from the first status to the second status.

The detailed configuration and operation of the respective steps in the display control method and the respective devices in the electronic apparatus 10 according to the embodiment are described detailed in the electronic apparatus described with reference to FIGS. 1 to 11 above, and thus, the repetitive description thereof is omitted.

Figure 13:
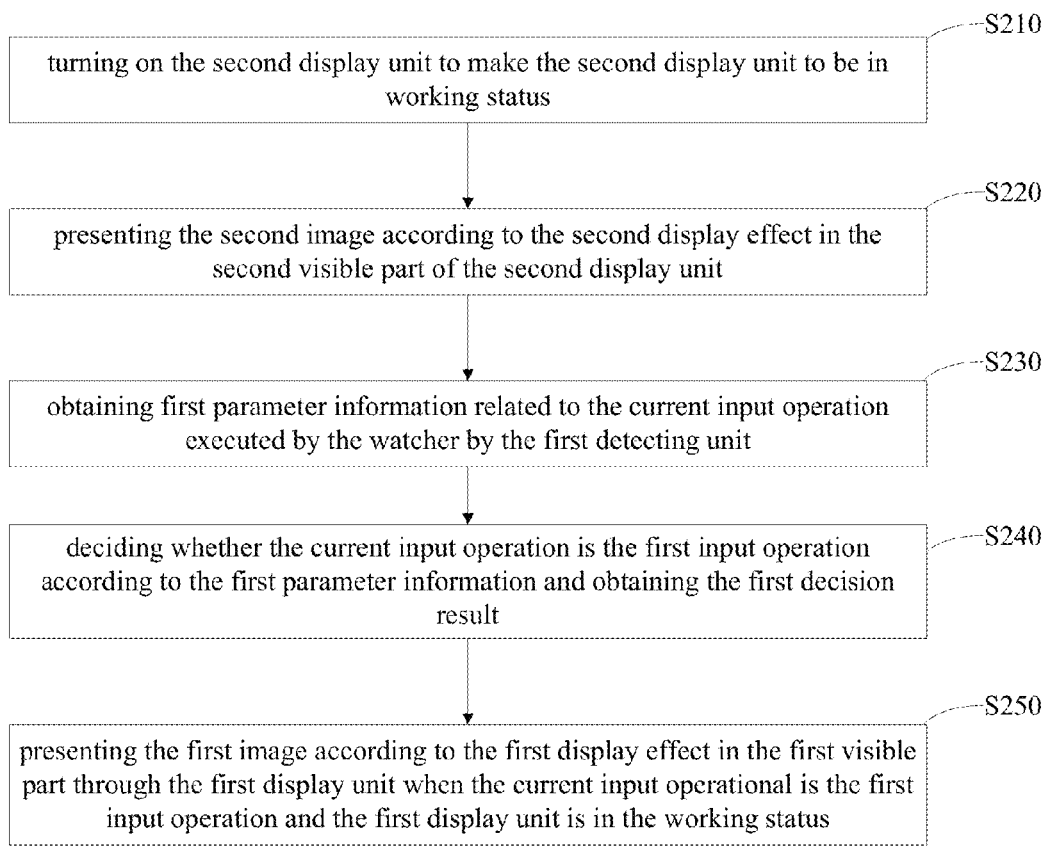
FIG. 13 illustrates a flow chart of a display control method according to another embodiment of the present disclosure.

FIG. 13 illustrates a flow chart of a display control method according to another embodiment of the present disclosure.

The display control method as show in FIG. 13 is applied in the electronic apparatus shown in FIG. 8. As explained in the above, the electronic apparatus further includes: the second display unit including the second visible part and for displaying the first image, wherein the second visible part is the part watched by the user so as to perceive the display content thereof in the second display unit.

Hereinafter, in a specific example in which the electronic apparatus is the wristlet type electronic apparatus as shown in FIG. 9, a display switching method according to the embodiment is described detailed with reference to FIG. 13. However, it needs to explain that the present disclosure is not limited thereto. The electronic apparatus may be any type of electronic apparatus including, but not limited to a finger band type electronic apparatus, a notebook computer, a tablet computer, a mobile telephone, a multimedia player, a personal digital assistants or the like. The first display unit and the second display unit may be same or different type of display units. For example, one of the first display unit and the second display unit is a normal display, and another one is the near-eye display. Alternatively, both of them may also be the normal display at the same time, or the near-eye display at the same time. Further, the display switching method according to the embodiment is also applied in any other processing in the electronic apparatus.

As shown in FIG. 13, the display switching method according to the embodiment includes:

In step S210, the second display unit is turned on to make the second display unit to be in working status.

When the user needs to use the electronic apparatus 100 to execute specific functions (for example, viewing time, dialing/receiving phone call, sending and receiving short message, browsing webpage or the like), since an angle of visibility of the normal display is large, it does not need operations such as position alignment or the like at the time of watching, and as compared to the near-eye display, it has a better convenience as using, so the second display unit 105 is used preferentially.

In order to provide the user with a graphical user interface, in the electronic apparatus 100, the processing unit 103 generates the display image continually and control the second display unit 105 to display continually.

However, since the electronic apparatus 100 is a portable electronic apparatus relying on an internal battery to supply power (for example, the wearable electronic apparatus), and since a volume of the wearable electronic apparatus determine that capacity of the internal battery is not large usually, executing image display in the second display unit 105 continually results in stand-by time of the electronic apparatus 100 to reduce significantly. Therefore, the electronic apparatus 100 is made to enter a stand-by status when the user does not operate, to save power consumption. And when the user operates, the electronic apparatus 100 is reactivated.

In order to decide whether it needs to activate the electronic apparatus 100 from the stand-by status to the working status, the second parameter information related to current input operation executed by the watcher is obtained by the first detecting unit 106, and whether the current input operation is a second input operation is decided according to the second parameter information and a second decision result is obtained. When the second decision result indicates that the current input operation is the second input operation, the second display unit is turned on to make the second display unit to be in the working status.

In the first embodiment, the above-described detection operation can be executed depending on different usage gesture of the user to the electronic apparatus 100.

For example, whether the current input operation executed by the user is the second input operation is detected firstly, the second input operation is moving the electronic apparatus 100 from other position to a second distance farther from himself by the user by driving his arm. Then, only when it detects that the user executes the second input operation, the electronic apparatus 100 is switched from the stand-by status to the working status.

Hereinafter, for the convenience of understanding, the first embodiment is explained continually by taking the wristlet type electronic apparatus (for example, the smart watch) as example of the electronic apparatus 100.

In case that the wristlet type electronic apparatus is used normally, the user may wear the electronic apparatus 100 on his own wrist. Such specific usage gesture decides the following fact, that is, when the user does not need to use the electronic apparatus 100, the user may relax his arm, to make the arm against one side of his body (it is obvious that, if the user is not in a relaxed status but take other operations, the arm of the user may also be in other positions, for example, when the user is running, his arm is in both sides of his body and waves continually). And when the user needs to use the second display unit 105 of the electronic apparatus 100, the user may lift his arm and turn a part of the body wearing the electronic apparatus 100 (for example, the wrist), so that the electronic apparatus 100 approaches the user as the watcher, and keep the second visible part 1051 at the second distance farther from the user in a status parallel with the ground or an approximately parallel status. For example, at the second distance, the user may watch the real image corresponding to the second image in the second visible part 1051 of the second display unit 105.

That is, when the user needs to use the second display unit 105 to implement specific functions (for example, watching time, dialing/receiving phone call, sending and receiving short message, browsing webpage or the like), the user may drive his arm firstly to move the electronic apparatus 100 from one side of the body gradually to front of his chest, until he is at the second distance of the electronic apparatus 100, then, the user may watch corresponding user interface of the electronic apparatus 100 through the second visible part 1051 of the second display unit 105, and control the electronic apparatus 100 to implement the above-described specific functions through specified input device (not-illustrated, for example, the touch screen, a handwritten pen, voice control, body sense control or the like).

Therefore, it detects whether the input operation executed by the watcher to the electronic apparatus is the second input operation based on a principle that acceleration component of gravity on respective Y directions in a reference coordinate (for example, a three-dimensional system of coordinate) of the electronic apparatus 100 is different in different usage status.

The X-axis, the Y-axis and the Z-axis constituting the three-dimensional system of coordinate are set on the electronic apparatus, wherein the plane constituted by the X-axis and the Y-axis station is parallel with a screen where the second visible part 1051 is, and the Z-axis is perpendicular to the screen where the second visible part 1051 is. When the user holds the electronic apparatus 100 by hand to make the second visible part 1051 to be placed perpendicular to the ground, the Y-axis and the direction of the acceleration of gravity G are in a line.

In particular, when the user relaxes the arm wearing the electronic apparatus 100, as explained in the above, the electronic apparatus 100 must slide downward to front of the wrist of the user and caught by palm due to a gravity action, thus the component in the X-axis of the acceleration of gravity G is relatively large, and components in the Y-axis and the Z-axis are relatively small. In contrary, when the user watches the second display unit 105 of the electronic apparatus 100 as the smart watch, the user needs to lift the electronic apparatus 100 and turn the second visible part 1051 in the electronic apparatus 100 to a horizontal status and towards the eyes of the user, thus, components on the respective axis of the acceleration of gravity G would subject to a series of variations and fix as that the component in the Z-axis is the largest, and the components in the X-axis and the Y-axis are relatively small finally.

For this reason, the first detecting unit 106 is a first sensing device for obtaining information of spatial location of the electronic apparatus under control of the input operation executed by the watcher. At this time, depending on the above usage gesture of the electronic apparatus under normal conditions, by deciding whether gravity direction in the electronic apparatus moves from an original position (for example, at an original distance very far away from the watcher) to the second position (for example, at the second distance farther from the watcher) according to the information of spatial location obtained by the first detecting unit 106, and deciding whether the electronic apparatus rotates from an initial angle (perpendicular to the ground, that is, the X-axis points to the gravity direction) to a second angle (parallel with the ground, that is, the Z-axis is opposite to the gravity direction) with the first operation body as center, the above-described detection function is implemented.

For example, the first detecting unit 106 includes a gyroscope or a gravity sensor or the like set in interior of the electronic apparatus 100. When the arm of the user is in a certain gesture, the gyroscope or the gravity sensor detects component parameter of the acceleration of gravity on respective Y directions in the three-dimensional system of coordinate of the electronic apparatus 100, and sense component parameter of angular acceleration generated by the user rotating the wrist, and whether the current input operational of the user is the second input operation is decided through combination of these two actions.

Further, in the second embodiment, the electronic apparatus 100 in stand-by status can be waked up by detecting the user touching an active area in the electronic apparatus 100, so as to turn on the second display unit 105 to make the second display unit 105 to be in the working status.

For this reason, the first detecting unit 106 is a second sensing device for sensing information of control operation generated by the second operation body of the watcher (for example, a finger) approaches or contacts the sensing area. The sensing area includes at least a part of the second visible part 1051.

For example, the first detecting unit 106 is a touch sensor. At this time, by deciding whether the second operation body touches or approaches at least a part of the second visible part according to the information of control operation obtained by the first detecting unit 106 (for example, track information, click information, s approaching information or the like), it detects whether the user operates the active area in the second display unit 105 of the electronic apparatus.

Alternatively, in the third embodiment, simply, it detects whether the input operation of the electronic apparatus is the second input operation based on a principle that the distance between the electronic apparatus 100 and the user are different in different usage status.

In particular, when the user does not use the electronic apparatus 100, the electronic apparatus 100 is usually away from the eyes of the user, thus, the distance between the electronic apparatus 100 and the user is very far. In contrary, when the user watches the second display unit 105 of the electronic apparatus 100 as the smart watch, the user needs to lift the electronic apparatus 100 and turn the second visible part 1051 in the electronic apparatus to the horizontal status and towards the eyes of the user, thus, the distance between the electronic apparatus 100 (especially, the second visible part 1051) and the user is relatively far, for example, the second distance.

For this reason, the first detecting unit 106 is a third sensing device for sensing a distance between the watcher and the electronic apparatus 100 (in particular, the body device 101).

For example, the first detecting unit 106 is the proximity sensor, when the arm of the user is in a certain gesture, the proximity sensor detects the distance between the electronic apparatus 100 and the user, and it decides whether the input operation of the user is the second input operation according to whether the distance between the electronic apparatus 100 and the user is equal to the second distance.

Figure 14:
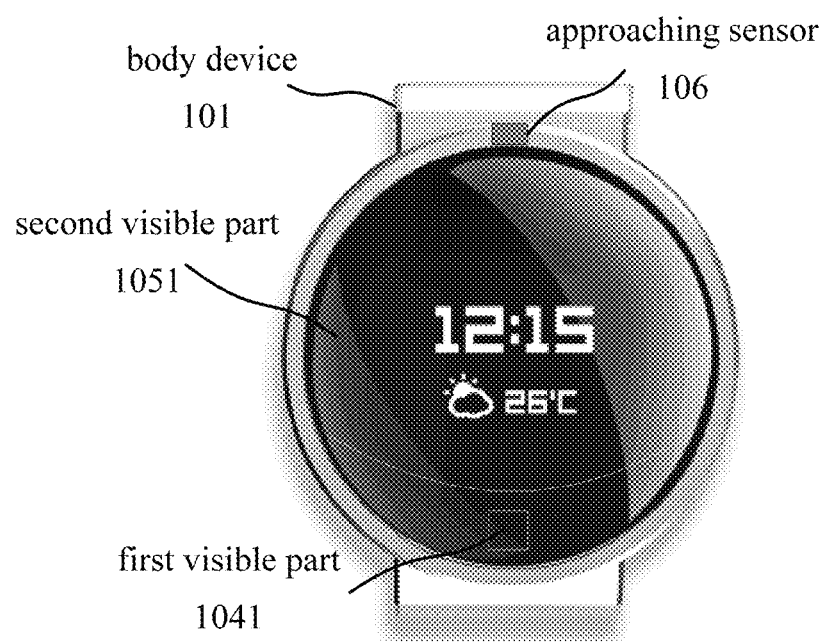
FIG. 14 illustrates an effect diagram of top view of the electronic apparatus according to the embodiment of the present disclosure.

FIG. 14 illustrates an effect diagram of top view of the electronic apparatus according to the embodiment of the present disclosure.

As shown in FIG. 14, the proximity sensor is set at a position which is in a same surface as the second visible part 1051 in the electronic apparatus 100 and close to the second visible part 1051.

Further, in other embodiments, the first detecting unit 106 is a pressure sensor for detecting whether the user presses a power supply button equipped in the electronic apparatus 100. Alternatively, the first detecting unit 106 is a voice sensor for detecting whether the user issues a voice instruction for turning on the second display unit.

In step S220, the second image is presented according to the second display effect in the second visible part of the second display unit.

After the second display unit switches to the working status, the second image is presented according to a real image display modes in the second visible part 1051.

In particular, when the watcher brings the electronic apparatus 100 to his face and watches the second visible part 1051 in case of keeping the second distance, since the electronic apparatus 100 usually equip the second display unit 105 having a relatively small size as the wearable electronic apparatus, the displayed second image is a display interface including short or summary information.

For example, as shown in FIG. 14, the second image is a piece of outline information about time and weather forecast. Or, when the electronic apparatus 100 is receiving an incoming call from a communication initiator, only number of the incoming call, icon of whether to listen to the incoming call or the like are displayed in the second image.

In step S230, first parameter information related to the current input operation executed by the watcher is obtained by the first detecting unit.

Next, in order for the user to be able to watch more plentiful and interesting display interface in the electronic apparatus 100, the second display unit 105 having smaller output display area is switched to the first display unit 104 having larger output display area automatically or manually by the user, to obtain a better user experience.

In order to decide whether need to switch the electronic apparatus 100 from the second display unit 105 to the first display unit 104, the first parameter information related to the current input operation executed by the watcher can be obtained by the first detecting unit 106.

Similar to step S210, in the first embodiment, the above-described detection operation can be executed depending on different usage gesture of the user to the electronic apparatus 100.

For example, whether the current input operation executed by the user is the first input operation is detected firstly, the first input operation is moving the electronic apparatus 100 from the second position farther from the user to the first distance closer to himself by the user by driving his arm. Then, only when it detects that the user executes the first input operation, the display unit switching operation is executed.

Hereinafter, the first embodiment is explained continually by taking the wristlet type electronic apparatus (for example, the smart watch) as example of the electronic apparatus 100.

In case that the wristlet type electronic apparatus is used normally, the user may wear the electronic apparatus 100 on his own wrist. Such specific usage gesture decide the following fact, when the user needs to use the first display unit 104, the user may further lift his arm and turn the part of body wearing the electronic apparatus 100 (for example, the wrist) based on usage gesture of using the second display unit 105, so that the electronic apparatus 100 is more closer to the user as the watcher, and keep the first visible part 1041 at the first distance closer to the user in a status perpendicular to the ground or an approximately perpendicular status. For example, at the first distance, the user may watch the enlarged virtual image corresponding to the display interface of the electronic apparatus 100 in the first visible part 1041 of the first display unit 104.

That is, when the user needs to use the first display unit 104 to implement specific functions (for example, watching time, dialing/receiving phone call, sending and receiving short message, browsing webpage or the like), the user may drive his arm continually to move the electronic apparatus 100 from front of his chest to front of his eyes, until he is at the first distance of the electronic apparatus 100, then, the user may watch corresponding user interface of the electronic apparatus 100 through the first visible part 1041 of the first display unit 104, and control the electronic apparatus 100 to implement the above-described specific functions through specified input device (not-illustrated, for example, the touch screen, the handwritten pen, the voice control, the body sense control or the like).

Therefore, it similarly detects whether the input operation executed by the watcher to the electronic apparatus is the first input operation based on a principle that acceleration component of gravity on respective Y directions in a reference coordinate (for example, a three-dimensional system of coordinate) of the electronic apparatus 100 is different in different usage status.

The X-axis, the Y-axis and the Z-axis constituting the three-dimensional system of coordinate are set on the electronic apparatus, wherein the plane constituted by the X-axis and the Y-axis station is parallel with a screen where the second visible part 1051 is, and the Z-axis is perpendicular to the screen where the second visible part 1051 is.

In particular, when the user watches the first display unit 104 of the electronic apparatus 100 as the smart watch, the user needs to further lift the electronic apparatus 100 and turn the first visible part 1041 in the electronic apparatus to a vertical status and align with the eyes of the user, thus, the distance between the electronic apparatus 100 (especially, the first visible part 1041) and the user is relatively near, for example, the first distance.

For this reason, the first detecting unit 106 is the above first sensing device, for example, a gyroscope or a gravity sensor or the like provided in interior of the electronic apparatus 100, and for obtaining the information of spatial location of the electronic apparatus under control of the input operation executed by the watcher. At this time, depending on the above usage gesture of the electronic apparatus under normal conditions, by deciding whether gravity direction in the electronic apparatus moves from the second position (for example, at the second distance farther from the watcher) to the first position (for example, at the first distance closer to the watcher) according to the information of spatial location obtained by the first detecting unit 106, and deciding whether the electronic apparatus rotates from an second angle (parallel with the ground, that is, the Z-axis is opposite to the gravity direction) to the first angle (perpendicular to the ground, that is, the Y-axis is opposite to the gravity direction) with the first operation body as center, the above-described detection function is implemented.

Further, in the second embodiment, the second display unit 105 is switched to the first display unit 104 by detecting the user touching the active area in the electronic apparatus 100.

For this reason, the first detecting unit 106 is the above second sensing device, for example, a touch sensor or the like provided in interior of the electronic apparatus 100, and for sensing the information of control operation generated by the second operation body (for example, the finger) of the watcher approaching or contacting the sensing area. And, the sensing area includes at least a part of the first visible part 1041 and at least a part of the second visible part 1051.

At this time, by deciding whether the second operation body slides from at least a part of the second visible part to at least a part of the first visible part according to the information of control operation obtained by the first detecting unit 106 (for example, the track information, the click information, the approaching information or the like), it detects whether the user operates the active area in the first display unit 104 of the electronic apparatus.

Alternatively, in the third embodiment, it detects whether the input operation by the watcher to the electronic apparatus is the first input operation by detecting the distance 之间 the electronic apparatus 100 and the user.

In particular, when the user watches the first display unit 104 of the electronic apparatus 100 as the smart watch, the user needs to further lift the electronic apparatus 100 and turn the first visible part 1041 in the electronic apparatus to a vertical status and align with the eyes of the user, thus, the distance between the electronic apparatus 100 (especially, the first visible part 1041) and the user is relatively near, for example, the first distance.

For this reason, the first detecting unit 106 is the above third the sensing device, for example, the proximity sensor or the like provided in interior of the electronic apparatus 100, and may be common to the above proximity sensor for detecting the second input operation. It may also be a separate proximity sensor provided at a position which is at a same surface as the first visible part 1041 in the electronic apparatus 100 and close to the first visible part 1041.

Further, in other embodiments, the first detecting unit 106 is a voice sensor for detecting whether the user issues the voice instruction from switching from the second display unit to the first display unit.

In step S240, whether the current input operation is the first input operation is decided according to the first parameter information and the first decision result is obtained.

After obtaining the first parameter information related to the current input operation executed by the watcher, whether the current input operation executed by the user is the first input operation is determined according to the first parameter information, that is, it decides whether there is the watcher at the specific position of the electronic apparatus (the first distance at which it is able to perceive the virtual image) under control of the first input operation executed by the user.

Since a specific deciding principle is explained in the above first embodiment to the third embodiment with reference to step S230, the detailed description thereof is omitted.

If a positive decision result is obtained, the following step S250 is executed. In contrary, if a negative decision result is obtained, it returns to the step S230 to continue to execute the detection operation.

Further, in one example, in order to save power consumption of the electronic apparatus 100, power supply of the first display unit 104 is turned off when the first display unit 104 is not used. Therefore, before executing the step S250, the first display unit is turned on when the first decision result indicates that the current input operation is the first input operation, to make the first display unit to be in the working status.

In another example, also in order to save the power consumption of the electronic apparatus 100, the second display unit 105 is executed energy-saving operation after switching the display unit being working from the second display unit 105 to the first display unit 104. For example, display output of the second display unit is controlled, to make the second display unit to stop presenting the second image. Alternatively, power supply of the second display unit is turned off directly.

In step s250, when the current input operational is the first input operation and the first display unit is in the working status, the first image is presented according to the first display effect in the first visible part through the first display unit.

After the first display unit switches to the working status, the first image is presented according to a mode of virtual image display in the first visible part 1041.

In particular, when the watcher aligns the first visible part 1041 to his eyes when he take the electronic apparatus 100 to front of his eyes and keeps at the first distance, since the first display unit 104 equipped in the electronic apparatus 100 as the wearable electronic apparatus is a virtual image display unit, the virtual image presented thereof is not limited to a screen having small size, and thus the displayed first image is a display interface including detailed information.

FIGS. 15A to 15E illustrate comparison diagrams between a second image and a first image according to the embodiment of the present disclosure.

Left graphs of FIG. 15A to FIG. 15E illustrates the second image presented according to the second display effect in the second visible part through the second display unit in step S220, and right graphs of FIG. 15A to FIG. 15E illustrates the first image presented according to the first display effect in the first visible part through the first display unit in step S250.

Figure 15A:
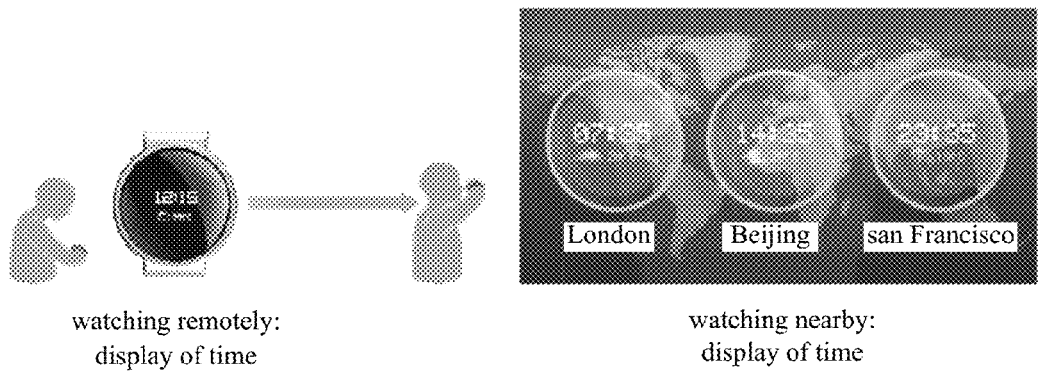
FIGS. 15A to 15E illustrate comparison diagrams between a second image and a first image according to the embodiment of the present disclosure.

In particular, in FIG. 15A, the left graph presents summary information about time display, wherein only time and temperature are included. And the right graph presents the detailed information about the time display which includes a universal time, a world map, name of city or the like.

Figure 15B:
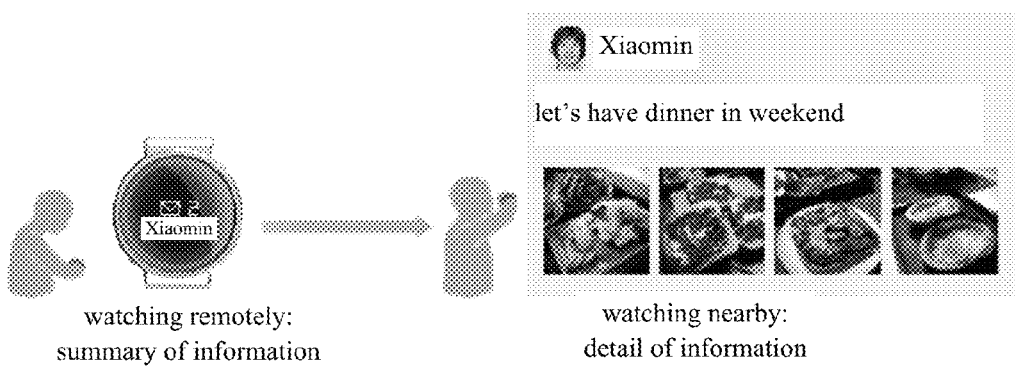

In FIG. 15B, the left graph presents summary information about information display which includes only number of un-read information and name of contactor. And the right graph presents the detailed information about information display which includes head portrait of contactor, name of contactor and detailed content (text and image) of information or the like.

Figure 15C:
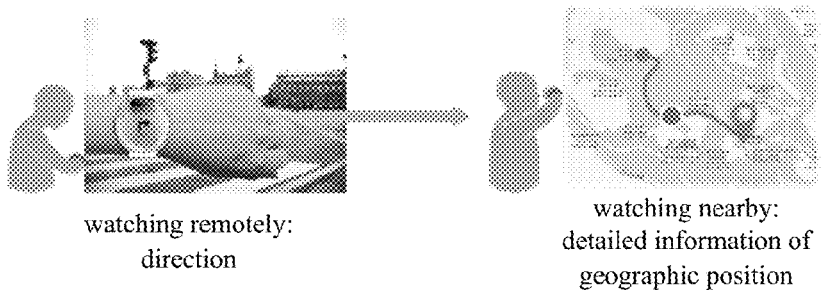

In FIG. 15C, the left graph presents summary information about navigation display which includes only a direction indication. And the right graph presents the detailed information about navigation display which includes map, route planning and position indication about current position, position of next node, focus or the like.

Figure 15D:
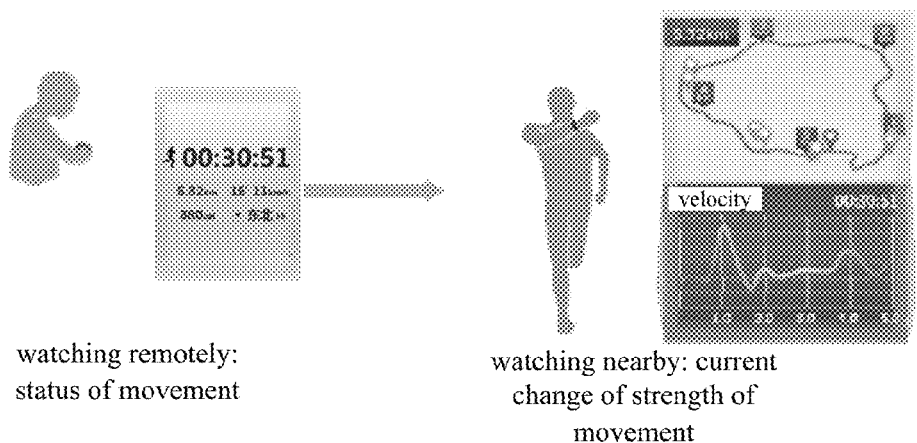

In FIG. 15D, the left graph presents summary information about motion display which includes only timing, number of kilometers, velocity, heat consumption, direction. And the right graph presents the detailed information about motion display which includes timing, number of kilometers, velocity histogram, map, movement track and indications on current and historical orientation or the like.

Figure 15E:
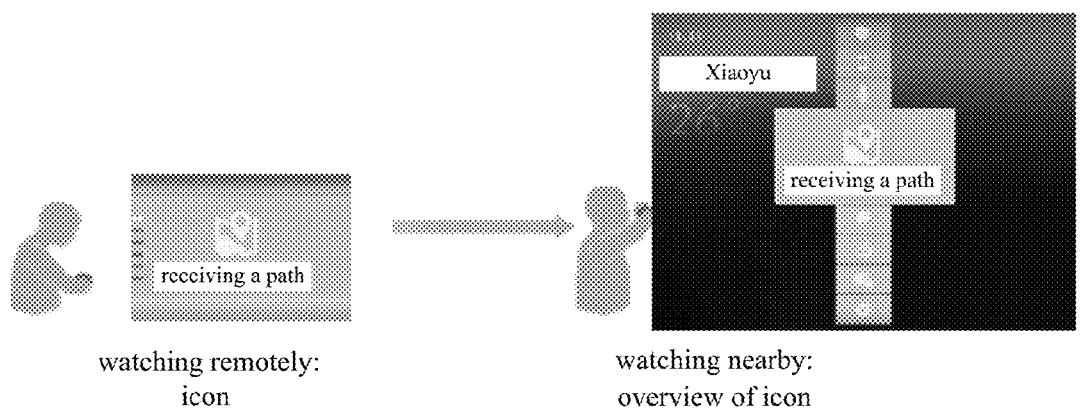

In FIG. 15E, the left graph presents summary information about icon display which includes only a current display image. And the right graph presents the detailed information about icon display which includes time, temperature, current icon and list of adjacent icons or the like.

Therefore, in the embodiment, the display content can be switched by the change in distance through two juxtaposed adjacent screens in the normal display and the near-eye display. Further, the display content can be switched in top-and-bottom screens through two overlapped screens (wherein, the top screen is a transparent screen).

Such switch of the display content may be various.

In the first example, display switching between the second image and the first image is simple and direct, for example, the display of the second image is turned off firstly and then the display of the first image is turned on. Similarly, the display of the first image is turned on firstly and then the display of the second image is turned off. Alternatively, the display of the first image is turned on at the same time of keeping the display of the second image.

In the second example, watching experience of the user can be improved by a dynamic switching effect between the second image and the first image.

For example, in the above procedure from step S210 to step S250, that is, in a procedure of the user driving his arm to move the electronic apparatus 100 from a side of his body gradually to front of his chest and further move from front of his chest to front of his eyes, a far and near watching effect transition is made naturally and continuity of experience is achieved by a dynamic effect of far and near pictures.

In one embodiment, presenting the first image according to the first display effect in the first visible part through the first display unit includes: when the distance between the watcher and the body device is the first distance, controlling display output of the first display unit at a first moment, to make the size of the first image presented according to the first display effect in the first visible part and perceived by the watcher to be equal to the size of the second visible part. And when the distance between the watcher and the body device is the first distance, controlling display output of the first display unit at a second moment after the first moment, to make the size of the third image presented according to the first display effect in the first visible part and perceived by the watcher to be larger than the size of the second visible part, wherein, the display content of the first image is consistent with the display content of the second image.

In this embodiment, it generates the following display effect: when the electronic apparatus is in front of the chest of the watcher, the second image including summary information is displayed on the normal display, and when the electronic apparatus is moved from front of the chest to the front of the eyes, the first image having same size and content as the second image is displayed on the near-eye display, and then, the first image is further magnified on the near-eye display, and the first image is switched to the third image including the detailed information, so as to obtain a display effect of joining seamlessly between the normal display and the near-eye display.

In another embodiment, presenting the first image according to the first display effect in the first visible part through the second display unit includes: when the distance between the watcher and the body device is the first distance, controlling display output of the second display unit at a first moment, to make the size of the second image presented according to the second display effect in the second visible part and perceived by the watcher to be equal to the size of the second visible part; And when the distance between the watcher and the body device is the first distance, controlling display output of the second display unit at a second moment after the first moment, to make the size of the second image presented according to the second display effect in the second visible part and watched by the watcher to be less than the size of the second visible part; and when the distance between the watcher and the body device is the first distance, controlling display output of the first display unit at a third moment after the second moment, to make the size of the first image presented according to the first display effect in the first visible part and perceived by the watcher to be less than the size of the second visible part; and when the distance between the watcher and the body device is the first distance, controlling display output of the first display unit at a fourth moment after the third moment, to make the size of the third image presented according to the first display effect in the first visible part and perceived by the watcher to be larger than the size of the second visible part, wherein, the size of the first image perceived by the watcher at the third moment is equal to the size of the second image watched by the watcher at the second moment, and the display content of the first image is consistent with the display content of the second image.

In this embodiment, it generates the following display effect: when the electronic apparatus is in front of the chest of the watcher, the second image including summary information is displayed on the normal display, and when the electronic apparatus is moved from front of the chest to the front of the eyes, the second image is reduced gradually and becomes the first image of small size ultimately (for example, a circular shape, a square shape, some kind of pattern or even no display), and then, the third image having same size and content as the first image is displayed on the near-eye display, and this third image is further magnified on the near-eye display gradually, and becomes the fourth image including the detailed information, so as to obtain another display effect of joining seamlessly between the normal display and the near-eye display.

It is obvious that the dynamic switching effect between the second image and the first image is not limited to the above two modes, as long as an interface animation of the normal display and the near-eye display keeps consistent at an instant from far to near of from a side of the body to the front of the chest and further to the front of eyes. For example, in another embodiment, the second image displayed in the normal display becomes large from small and fades out, at the same time of fade-out of the second image, the first image displayed in the near-eye display generates a space effect from the near to the distant, and the content is from small to large and fades in.

Thus it can be seen, by using the display switching method according to the embodiment, the parameter information related to the input operation can be obtained at the time of detecting the input operation executed by the watcher to the electronic apparatus currently, and different display units are turned on according to the parameter information, so as to present display images according to different display effects in corresponding visible parts through different display units according to different requirements of the user. Therefore, in the embodiment, the second display unit outputs the real image corresponding to the display image, so that the watcher positioned at the second distance of the electronic apparatus is able to watch the real image in the second visible part, and the first display unit is for outputting the virtual image corresponding to the display image, so that the watcher positioned at the first distance of the electronic apparatus is able to perceive the virtual image in the first visible part, wherein, the size of the real image watched is equal to the size of the second visible part, and the size of the virtual image perceived is larger than the size of the first visible part. And, based on the above configuration of the display unit, there provides an electronic apparatus and the display switching method thereof which are able to provide the image or video display having larger size and higher resolution without being limited by size of the wearable electronic apparatus itself such as the smart watch. More than that, the content displayed in the electronic apparatus can be decided and switched automatically according to far and near of watching distance of the user. Further, a smooth switching can be brought to the user by the dynamic effect between the real image and the virtual image to obtain a good watching experience of the user.

That is, advantages of using the embodiments are that:

1. Displayed information is presented intelligently by a mode of acquiring summary information remote and watching the detailed information in vicinity, which very conforms to watching psychological anticipation of the user.

2. Frequent operations on the small screen is simplified.

3. The display content is not limited to number of small size, and abundant information can be displayed.

4. Technical problems of the watching experience of the user being unnatural and the uncomfortable feeling brought by inconsistent size of near picture and far picture in the conventional display device based on light guide optical element (LOE) is overcome, and the far and near watching effect transition is made naturally and continuity of experience is achieved by the dynamic effect between far and near pictures.

Hereinbefore, the electronic apparatus and display control method according to the embodiment are described with reference to FIG. 1 to FIG. 15E. According to the electronic apparatus and the display control method of the embodiment, by using a display of the enlarged virtual image including display components and optical system, image or video display having larger size and higher resolution is implemented without being limited by a size of the wearable electronic apparatus such as the smart watch itself. At the same time, the electronic apparatus has lower power consumption as compared to a mini projector for displaying larger image, and is not limited by using environment, and provides good using privacy. Further, the electronic apparatus further implement a control suitable for the display status of the near-eye optical display system of the wearable electronic apparatus by using a parameter detection operation including various kinds of detecting units, so as to provide optimal user experience to various kinds of usages of the electronic apparatus.

With the description of the above implementation mode, those skilled in the art can clearly understand that this disclosure can be implemented by means of software plus necessary hardware platform, of course, it can be implemented by software or hardware totally. Based on such understanding, the technical solution of this disclosure essentially or the part contributed to the conventional description can be embodied by a form of a software product, the computer software product can be stored in a storage medium, such as a ROM/RAM, a magnetic disc, an optical disk or the like, it includes some instructions to cause a computer equipment (it may be a personal computer, a server or a network equipment or the like) to execute the method according to the respective embodiments of a certain part of the embodiments.

The respective embodiments are described detailed above. However, those skilled in the art should understand, these embodiments can be made various modifications, combination or sub-combination without departing from the principle and spirit of the present disclosure, and such modification should fall into the range of the present disclosure.

The invention claimed is:

1. An electronic apparatus comprising:
   a first display unit comprising a first visible part for displaying a first image, wherein the first visible part is a part watched by a user so as to perceive a display content thereof in the first display unit;
   a first detecting unit for detecting a first parameter and for indicating a relative distance between a target object and the first visible part in a detection area, wherein, the first detecting unit comprises a touch control sensing unit for generating variation of electric current of different intensities as the first parameter in response to a good conductor approaching or contacting with the detection area and a detecting sensor of the touch control sensing unit is at least partially overlapped with a watching area of the first visible part; and
   a processing unit for generating an image to be displayed and for controlling a display of the first display unit according to at least the first parameter,
   wherein, when the first display unit is in a first status, as a distance between the target object and the first visible part decreases, a degree of electric current change generated by the touch control sensing unit increases, so that when an amplitude of the electric current change exceeds a certain threshold, it decides that the relative distance is less than a threshold distance, and the target object have already entered into the watching area of the first visible part, then the processing unit controls the first display unit to switch from the first status to a second status, wherein a power consumption of the first display unit in the first status is lower than a power consumption of the first display unit in the second status.

2. The electronic apparatus according to claim 1, wherein, the first display unit comprises a first display component for displaying the first image and a first optical component for receiving a light ray corresponding to the first image emitted from the first display component and carrying out a light path conversion to the light ray corresponding to the first image to form an enlarged virtual image corresponding to the first image, wherein, at least a part of the first optical component is the first visible part.

3. The electronic apparatus according to claim 1, further comprising:
   a body device;
   a fixing device connected to the body device and comprising at least a fixing status in which the fixing device is able to be at least part of an annular space or at least a part of an approximate annular space satisfying a first predetermined condition, wherein, the annular space or the approximate annular space is able to surround a periphery of a columnar body satisfying a second predetermined condition;
   wherein the processing unit is provided on the body device or the fixing device, and the first display unit is provided on the body device and/or the fixing device.

4. The electronic apparatus according to claim 1, further comprising a second detecting unit for detecting a second parameter related to the electronic apparatus, wherein the second parameter has a different type than the first parameter, and wherein, the processing unit controls the first display unit to switch status according to at least a combination of the first parameter and the second parameter.

5. The electronic apparatus according to claim 4, wherein, the second detecting unit comprises a motion sensor for detecting a current motion amplitude of the electronic apparatus as the second parameter, and
   in case of deciding that the motion amplitude is larger than or equal to a threshold amplitude, when the first display unit is in the first status, the processing unit controls the first display unit to maintain in the first status; or
   in case of deciding that the motion amplitude is less than the threshold amplitude, when the first display unit is in the second status, if it decides that the relative distance is larger than the threshold distance according to the first parameter, the processing unit controls the first display unit to switch from the second status to the first status; or
   when the first display unit is in the first status, if it decides that the relative distance is less than or equal to the threshold distance according to the first parameter, the processing unit controls the first display unit to switch from the first status to the second status.

6. The electronic apparatus according to claim 4, wherein the second detecting unit comprises a motion sensor for detecting a translational motion in a first direction and a rotating motion around a first axis in the electronic apparatus, to determine a motion mode of the electronic apparatus as the second parameter, and
   in case of deciding that the motion mode does not match a predetermined mode, when the first display unit is in the first status, the processing unit controls the first display unit to maintain in the first status; or
   in case of deciding that the motion mode matches with the predetermined mode, when the first display unit is in the second status, if it decides that the relative distance is larger than the threshold distance according to the first parameter, the processing unit controls the first display unit to switch from the second status to the first status; or
   when the first display unit is in the first status, if it decides that the relative distance is less than or equal to the threshold distance according to the first parameter, the processing unit controls the first display unit to switch from the first status to the second status.

7. The electronic apparatus according to claim 4, wherein the second detecting unit comprises a gesture sensor for detecting a current gesture of the electronic apparatus as the second parameter, and
   in case of deciding that the current gesture does not match with a predetermined gesture, when the first display unit is in the first status, the processing unit controls the first display unit to maintain in the first status; or in case of deciding that the current gesture matches with the predetermined gesture, when the first display unit is in the second status, if it decides that the relative distance is larger than the threshold distance according to the first parameter, the processing unit controls the first display unit to switch from the second status to the first status; or when the first display unit is in the first status, if it decides that the relative distance is less than or equal to the threshold distance according to the first parameter, the processing unit controls the first display unit to switch from the first status to the second status.

8. The electronic apparatus according to claim 1, further comprising a second display unit comprising a second visible part and for displaying a second image, wherein the second visible part is a part watched by the user so as to perceive the display content thereof in the second display unit, wherein the first display unit and the second display unit are display units following different display principles.

9. A display control method applied in an electronic apparatus, wherein, the electronic apparatus includes a first display unit comprising a first visible part for displaying a first image, wherein the first visible part is a part watched by a user so as to perceive a display content thereof in the first display unit; a first detecting unit for detecting a first parameter for indicating a relative distance between a target object and the first visible part in a detection area, wherein a detecting sensor included in the first detecting unit is at least partially overlapped with a watching area of the first visible part; and a processing unit for generating an image to be displayed and controlling a display of the first display unit according to at least the first parameter, the display control method comprising:

detecting the first parameter in the detection area, wherein, generating variation of electric current of different intensities in response to a good conductor approaching or contacting with the detection area as the first parameter; and controlling display of the first display unit according to at least the first parameter, wherein, controlling display of the first display unit according to at least the first parameter comprises:

when the first display unit is in a first status as a distance between the target object and the first visible part decreases, a degree of electric current change generated by the touch control sensing unit increases, so that when an amplitude of the electric current change exceeds a certain threshold, it decides that the relative distance is less than a threshold distance and the target object have already entered into the watching area of the first visible part, then controlling the first display unit to switch from the first status to a second status, wherein, a power consumption of the first display unit in the first status is lower than a power consumption of the first display unit in the second status.

10. The display control method according to claim 9, wherein the electronic apparatus further includes a second detecting unit for detecting a second parameter related to the electronic apparatus, wherein the second parameter has different type from the first parameter and the display control method further comprises detecting the second parameter related to the electronic apparatus, and wherein, controlling display of the first display unit according to at least the first parameter comprises controlling the first display unit to switch status according to at least a combination of the first parameter and the second parameter.

11. The display control method according to claim 10, wherein detecting the second parameter related to the electronic apparatus comprises detecting a current motion amplitude of the electronic apparatus as the second parameter, and wherein controlling the first display unit to switch status according to at least a combination of the first parameter and the second parameter comprises:

in case of deciding that the motion amplitude is larger than or equal to a threshold amplitude, when the first display unit is in the first status, controlling the first display unit to maintain in the first status; or in case of deciding that the motion amplitude is less than the threshold amplitude, when the first display unit is in the second status, if it decides that the relative distance is larger than the threshold distance according to the first parameter, controlling the first display unit to switch from the second status to the first status; or when the first display unit is in the first status, if it decides that the relative distance is less than or equal to the threshold distance according to the first parameter, controlling the first display unit to switch from the first status to the second status.

12. The display control method according to claim 10, wherein detecting the second parameter related to the electronic apparatus comprises detecting a translational motion in a first direction and a rotating motion around a first axis in the electronic apparatus to determine a motion mode of the electronic apparatus as the second parameter, and wherein, controlling the first display unit to switch status according to at least a combination of the first parameter and the second parameter comprises:

in case of deciding that the motion mode does not match a predetermined mode, when the first display unit is in the first status, controlling the first display unit to maintain in the first status; or in case of deciding that the motion mode matches with the predetermined mode, when the first display unit is in the second status, if it decides that the relative distance is larger than the threshold distance according to the first parameter, controlling the first display unit to switch from the second status to the first status; or when the first display unit is in the first status, if it decides that the relative distance is less than or equal to the threshold distance according to the first parameter, controlling the first display unit to switch from the first status to the second status.

13. The display control method according to claim 10, wherein detecting the second parameter related to the electronic apparatus comprises detecting a current gesture of the electronic apparatus as the second parameter, and wherein, controlling the first display unit to switch status according to at least a combination of the first parameter and the second parameter comprises:

in case of deciding that the current gesture does not match with a predetermined gesture, when the first display unit is in the first status, the processing unit controls the first display unit to maintain in the first status; or in case of deciding that the current gesture matches with the predetermined gesture, when the first display unit is in the second status, if it decides that the relative distance is larger than the threshold distance according to the first parameter, the processing unit controls the first display unit to switch from the second status to the first status; or when the first display unit is in the first status, if it decides that the relative distance is less than or equal to the threshold distance according to the first parameter, the processing unit controls the first display unit to switch from the first status to the second status.

* * * * *